(12) United States Patent
Osechinskiy et al.

(10) Patent No.: US 10,161,960 B1
(45) Date of Patent: Dec. 25, 2018

(54) FILED-MAPPING AND FOCAL-SPOT TRACKING FOR S-SNOM

(71) Applicant: BRUKER NANO, INC., Tucson, AZ (US)

(72) Inventors: Sergey Osechinskiy, Santa Barbara, CA (US); Gregory Andreev, Santa Barbara, CA (US)

(73) Assignee: BRUKER NANO, INCORPORATED, Tucson, AZ (US)

( * ) Notice: Subject to any disclaimer, the term of this patent is extended or adjusted under 35 U.S.C. 154(b) by 0 days.

(21) Appl. No.: 16/055,430

(22) Filed: Aug. 6, 2018

Related U.S. Application Data

(63) Continuation of application No. 15/119,283, filed as application No. PCT/US2015/016157 on Feb. 17, 2015, now Pat. No. 10,067,159.

(60) Provisional application No. 61/941,556, filed on Feb. 19, 2014.

(51) Int. Cl.
*G01Q 60/06* (2010.01)
*G01Q 60/22* (2010.01)
*G01Q 20/02* (2010.01)
*G01Q 30/04* (2010.01)

(52) U.S. Cl.
CPC ............ *G01Q 20/02* (2013.01); *G01Q 30/04* (2013.01); *G01Q 60/22* (2013.01)

(58) Field of Classification Search
CPC ......... B82Y 10/00; B82Y 20/00; B82Y 35/00; G01Q 60/06; G01Q 60/22; G01Q 6/262; G01Q 6/3636; G01Q 6/3652; G01Q 6/4214; G01Q 6/4296
USPC ...................................... 250/234; 850/30, 62
See application file for complete search history.

(56) References Cited

U.S. PATENT DOCUMENTS

| | | | |
|---|---|---|---|
| 6,724,718 B1 * | 4/2004 | Shinohara | G02B 6/262 369/300 |
| 2006/0131493 A1 * | 6/2006 | Narita | B82Y 20/00 250/234 |
| 2017/0067934 A1 * | 3/2017 | Xu | G01Q 60/06 |

* cited by examiner

*Primary Examiner* — David A Vanore
(74) *Attorney, Agent, or Firm* — Yakov S. Sidorin; Quarles & Brady LLP

(57) ABSTRACT

System and method for optical alignment of a near-field system, employing reiterative analysis of amplitude (irradiance) and phase maps of irradiated field obtained in back-scattered light while adjusting the system to arrive at field pattern indicative of and sensitive to a near-field optical wave produced by diffraction-limited irradiation of a tip of the near-field system. Demodulation of optical data representing such maps is carried out at different harmonics of probe-vibration frequency. Embodiments are operationally compatible with methodology of chemical nano-identification of sample utilizing normalized near-field spectroscopy, and may utilize suppression of background contribution to collected data based on judicious coordination of data acquisition with motion of the tip. Such coordination may be defined without knowledge of separation between the tip and sample. Computer program product with instructions effectuating the method and operation of the system.

18 Claims, 16 Drawing Sheets

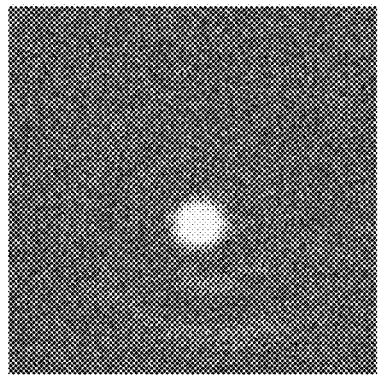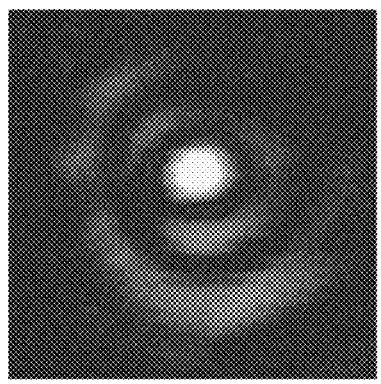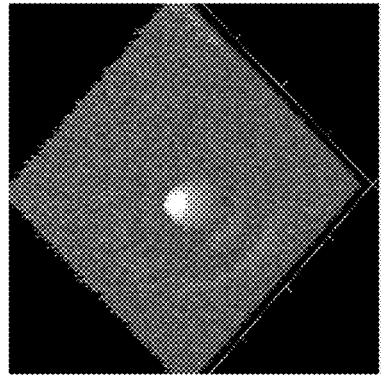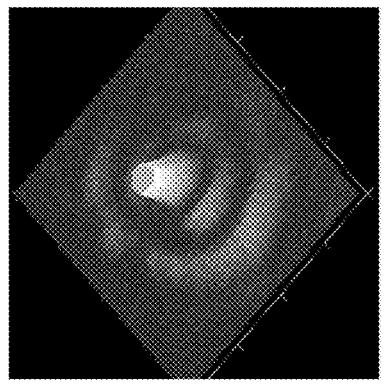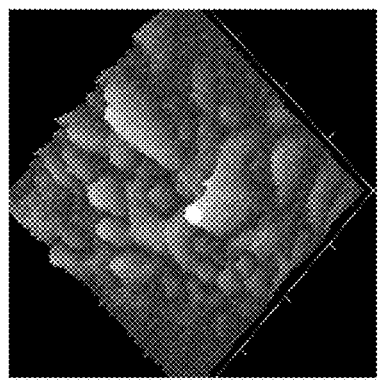

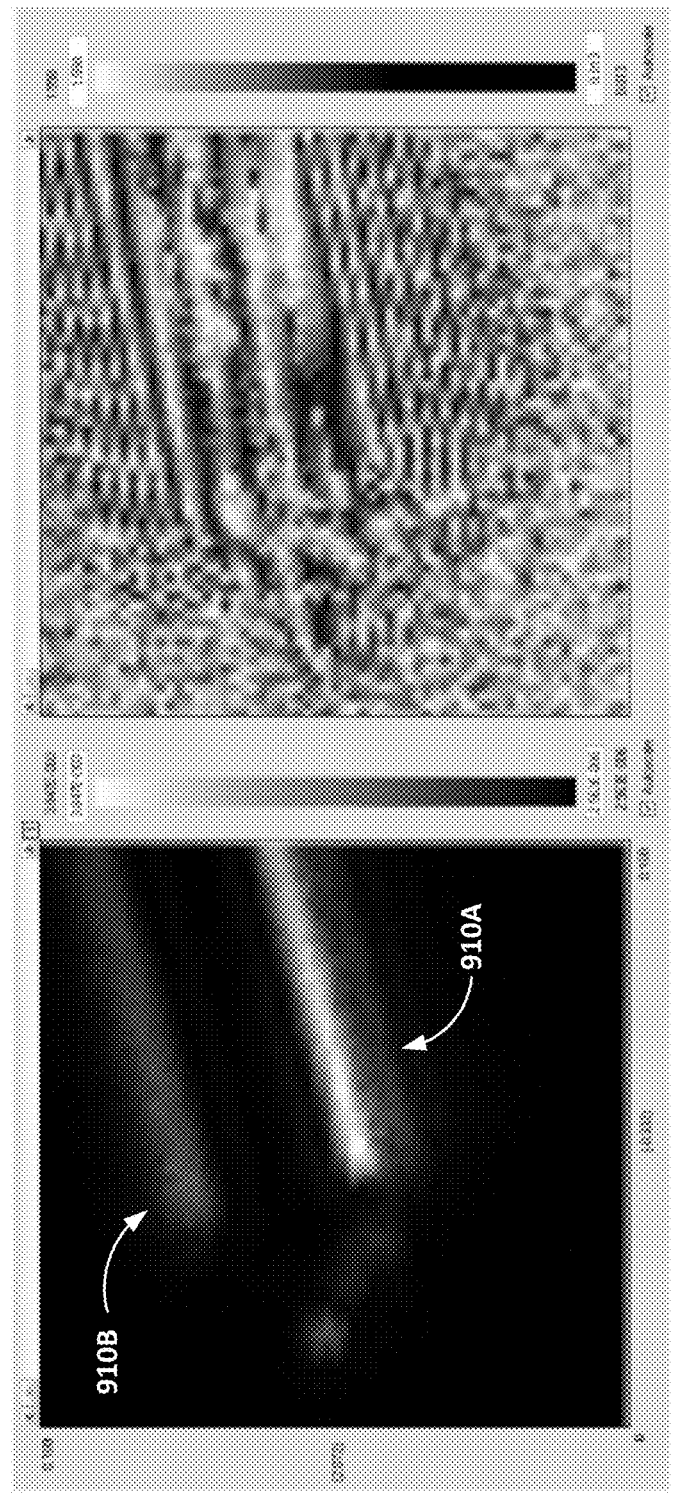

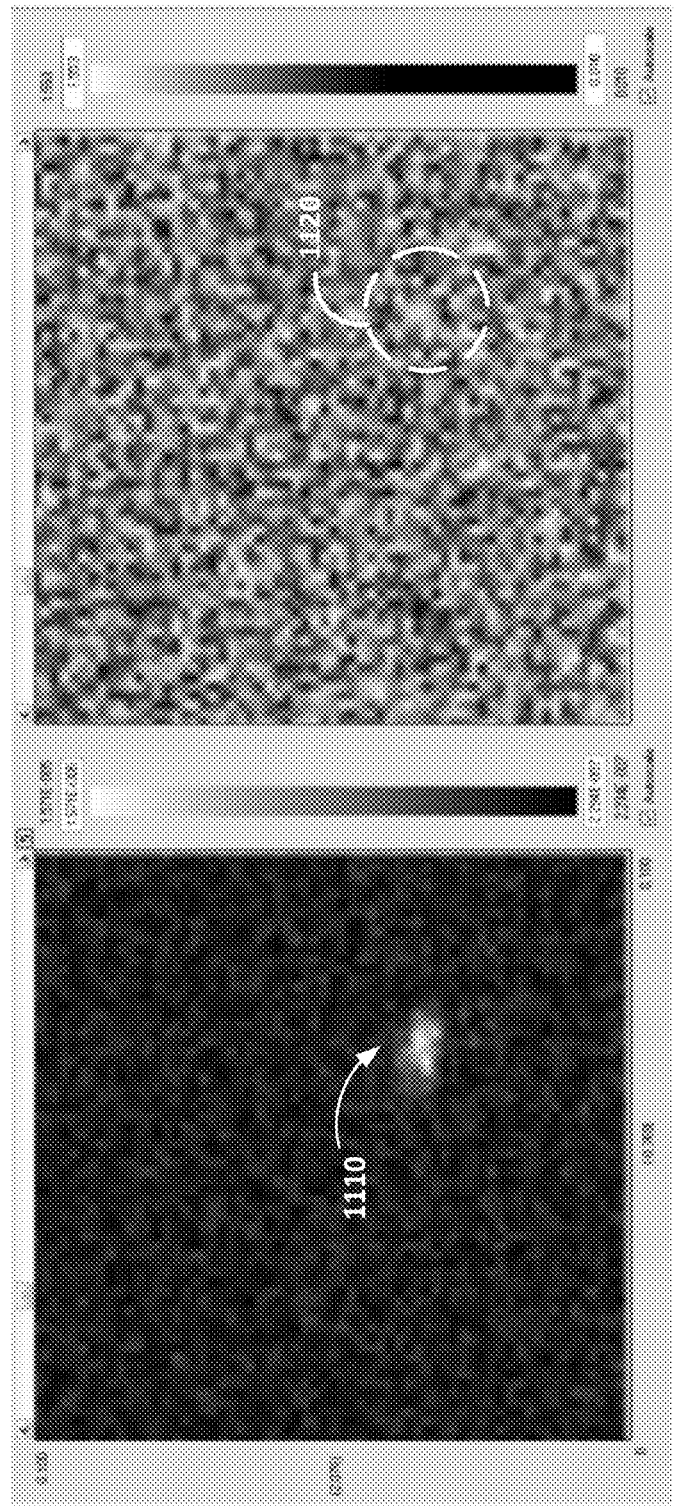

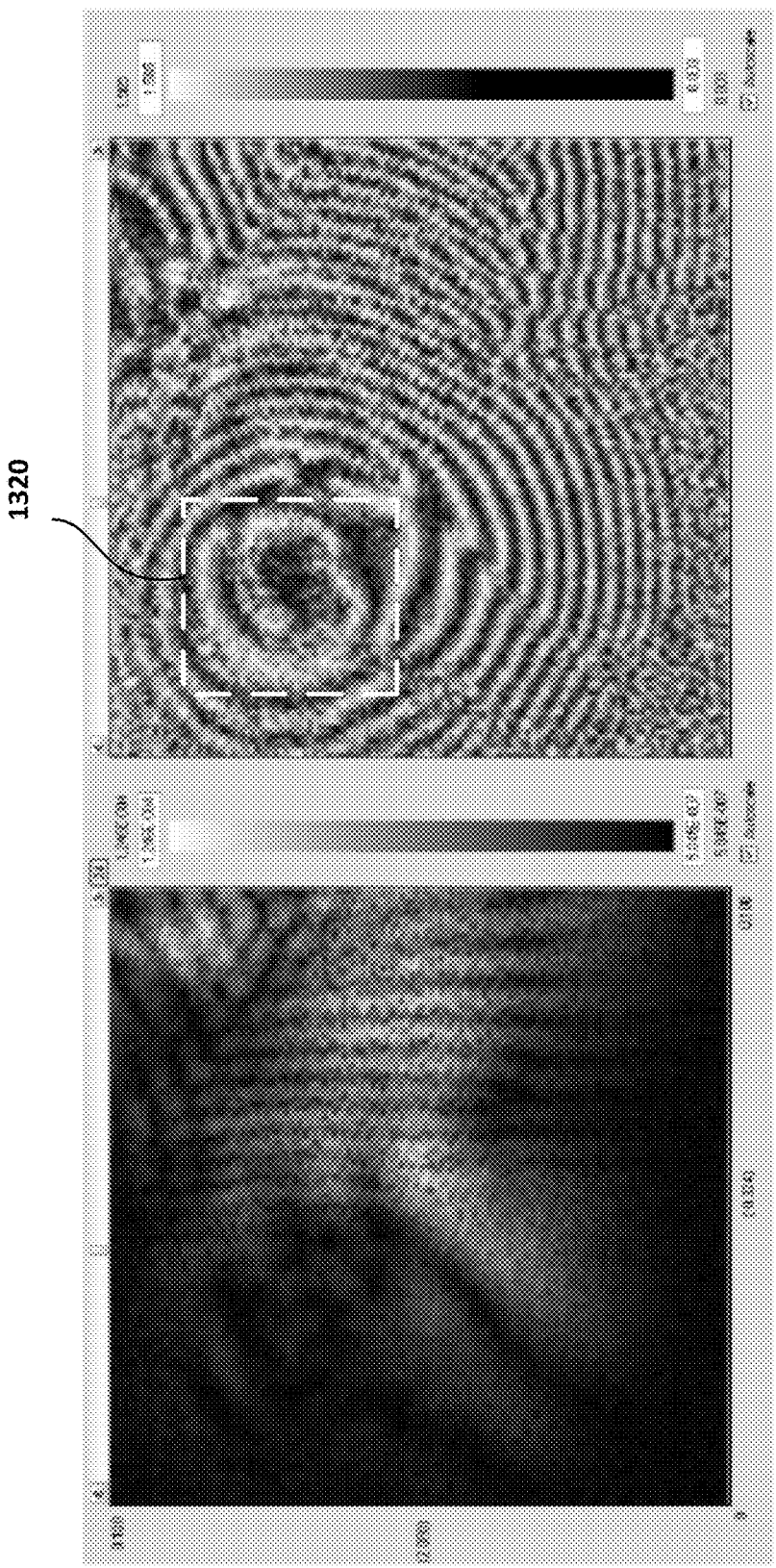

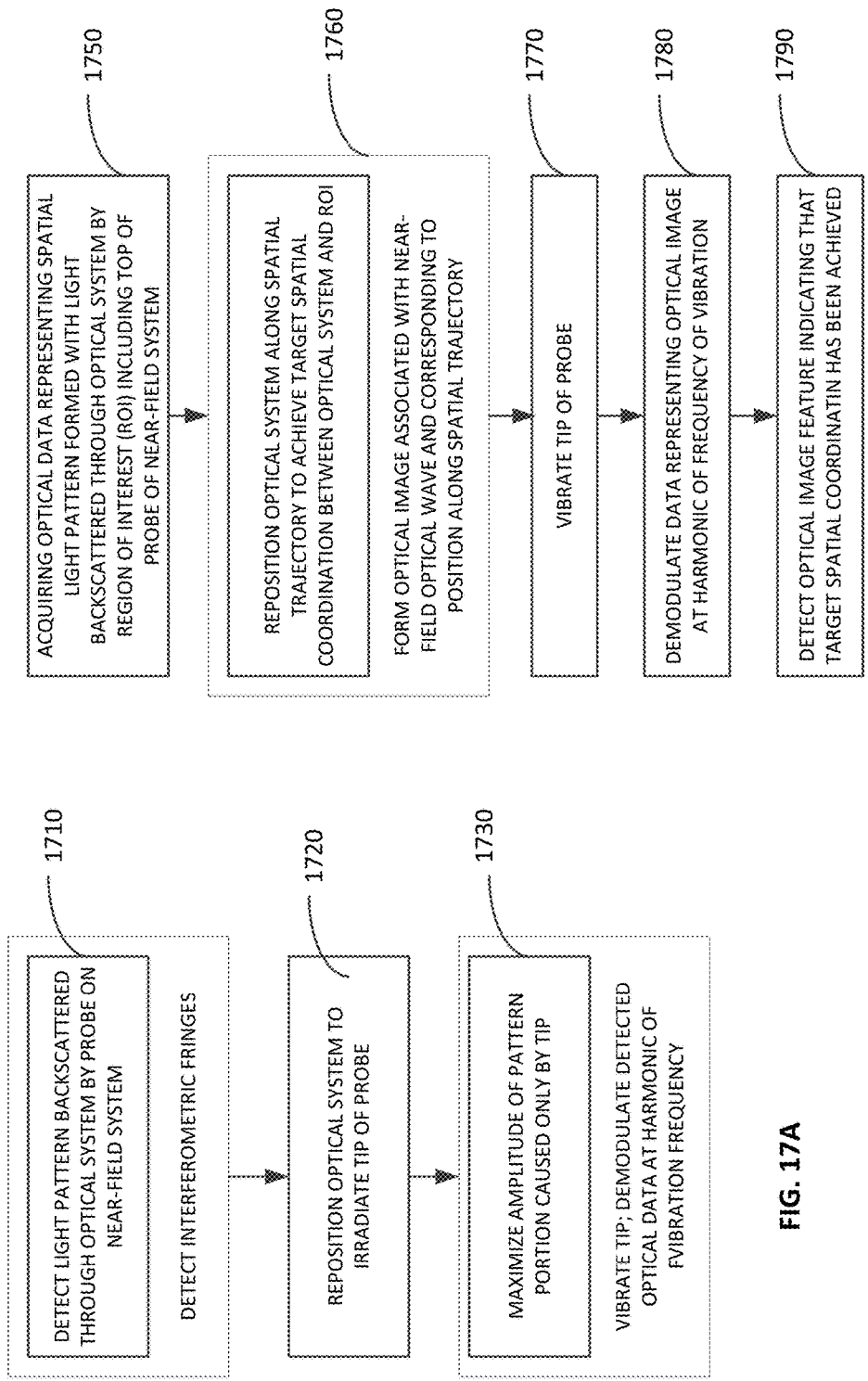

FILED-MAPPING AND FOCAL-SPOT TRACKING FOR S-SNOM

CROSS REFERENCE TO RELATED APPLICATIONS

The present application is a continuation from the U.S. patent application Ser. No. 15/119,283 now published as US 2017/0219621, which represents the national stage entry of the International Application No. PCT/US2015/016157 filed on Feb. 17, 2015 and claims benefit of and priority from the U.S. Provisional Patent Application No. 61/941,556 filed on Feb. 19, 2014. The disclosure of each of the above-identified patent applications is incorporated herein by reference.

TECHNICAL FIELD

The present invention relates to apertureless or scattering-type scanning near-field optical microscopy (commonly referred to as either a-SNOM or s-SNOM) and, in particular, to a s-SNOM / AFM system and method structured for optimization of the optical alignment of the system based on characterization of quality of a focal spot of light beam illuminating a probe thereof.

BRIEF DESCRIPTION OF THE DRAWINGS

The invention will be more fully understood by referring to the following Detailed Description in conjunction with the (generally not-to-scale) Drawings, of which:

FIGS. 3A, 3B, 3C show examples of two-dimensional field maps of an optical field distribution at the system's cantilever tip acquired with a signal detection technique implemented according to an embodiment of the invention and employing signal-demodulation at the fundamental harmonic (FIG. 3A), second harmonic (FIG. 3B); third harmonic (FIG. 3C) of the tapping frequency;

FIGS. 4A, 4B, 4C show examples of three-dimensional field maps of an optical field distribution at the system's cantilever tip acquired with a signal detection technique implemented according to an embodiment of the invention and employing signal-demodulation at the fundamental harmonic (FIG. 4A); second harmonic (FIG. 4B); third harmonic (FIG. 4C) of the tapping frequency;

FIGS. 9A and 9B are images of the amplitude and phase portions of a field map pattern obtained with an embodiment of the present invention and with the use of demodulation of the optical signal at the first harmonic of the frequency of vibration of the probe; light scattering occurs primarily from the probe cantilever;

FIGS. 11A and 11B are images of the amplitude and phase portions of a field map pattern obtained with an embodiment of the present invention and with the use of demodulation of the optical signal at the third harmonic of the frequency of vibration of the probe;

FIGS. 13A and 13B are images of the amplitude and phase portions of a field map pattern (obtained with an embodiment of the present invention and with the use of demodulation of the optical signal at the first harmonic of the frequency of vibration of the probe) containing a pattern representative of interference of light scattered by multiple component of the probe and the sample under test;

FIG. 17A is a flow-chart of an embodiment of the invention;

FIG. 17B is a flow-chart of a related embodiment of the invention.

DETAILED DESCRIPTION

Figure 1:
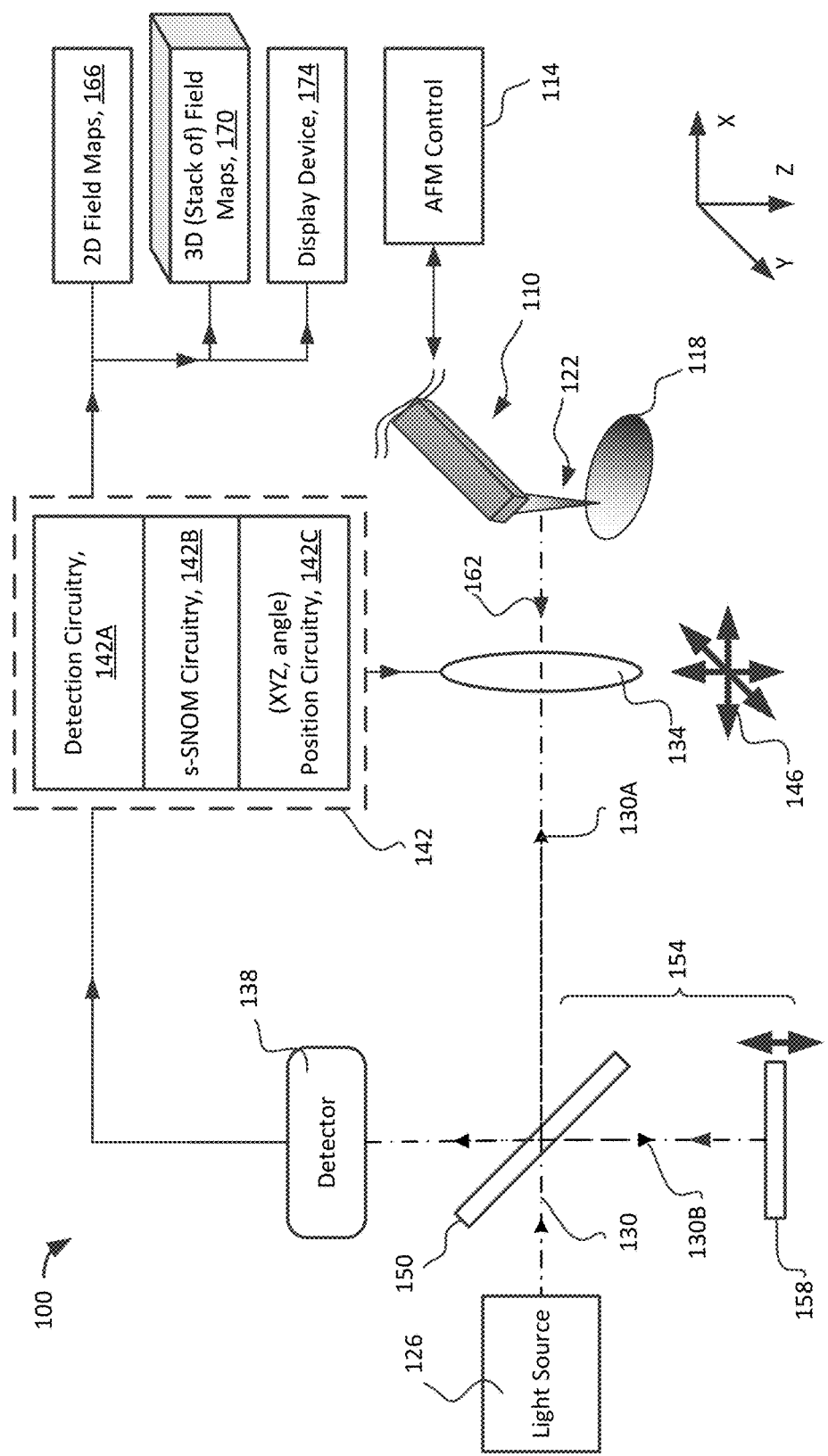
FIG. 1 is a schematic representation of an implementation of an s-SNOM system equipped with optical, positioning and control modules.

Near-field scanning optical microscopy (NSOM/SNOM) is known as a microscopy technique for investigation on a spatial scale that overcomes the far field resolution limit by exploiting the properties of evanescent waves. The acquisition of an image with the use of a probe, positioned to oscillate at distances much smaller than the wavelength λ of the illuminating light causes the resolution of the acquired image of the surface to be limited by the size of the probe and not by the wavelength of the illuminating light. Near-field optical microscopy modalities exist that can be operated in a non-aperture or apertureless mode, also referred to as scattering-type SNOM or s-SNOM.

In s-SNOM, the probe of an atomic force microscope (AFM) is utilized for localized probing, in a close proximity for a surface under test (SUT), of elastic (Rayleigh) scattering of the electromagnetic radiation (for example, light). The near-field in a gap between the tip and the sample can polarize the probe, and therefore can be re-radiated (for example, scattered) into the far-field.

Since the near field is indicative of the optical properties of the sample and is tightly spatially confined due to its evanescent nature, the detection of the near-field component that has been back-scattered into the far-field can reveal optical and dielectric properties of the sample with high spatial resolution, and an s-SNOM modality can be operated to obtain a spectroscopic map of the SUT at the nano-scale. In one situation, for example, the spatial resolution of an s-SNOM system can be better than 20 nm.

Notably, apart from a weak, near-field-related radiation component corresponding to and formed by the light scattered only by the probe tip, the illuminating light scattered by the probe additionally has a strong background component (which is due to back-scattering by the probe and the SUT itself, as well as multiple light-reflection-scattering contributed by these two elements). In order to optimize the s-SNOM imaging quality, the near-field component of interest has to be detected and discriminated from the background contribution. Since for the AFM and s-SNOM imaging the probe is usually vibrated (for example, in tapping mode), the scattered illuminating light is also modulated at the frequency of the probe vibration. The demodulation at higher harmonics of tapping frequency may be employed for rejection of the background component and the detection of the sought-after near-field component of the scattered light with a high signal-to-noise ratio.

It becomes clear, therefore, that precise and tight focusing of the incident light on the probe apex/tip, as well as efficient collection of light back-scattered by the probe tip, is of importance for the purposes of s-SNOM imaging. While the optimization of the focal spot based on the visual perception of an AFM-system operator can be and is generally employed in the systems of related art, such optimization is understandably inefficient and often imprecise. Indeed, the focal spot of the tip-illuminating, signal beam of light may not be always observable in practice such as, for example, when infra-red (IR) radiation is used. Although an attempt is made often to compensate for such a shortcoming of the usage of the IR illuminating radiation in the s-SNOM system by employing an additional visible guide beam, a skilled artisan readily recognizes that the compensation of this sort is not particularly reliable. For example, the lack of reliability and precision of the usage of the visible guide beam can be caused by various reasons such as, for example, (i) the fact that the focal spot of the guide beam does not necessarily spatially coincide with the focal spot of the IR signal beam due to chromatic aberrations of the used optical system, and/or (ii) the imprecise alignment of the train of optical elements of the optical system, and/or (iii) the lack of reliable ways to visualize the probe tip with an accessory optical system.

As a result, and practically without exceptions, the focusing and/or alignment of the s-SNOM signal IR beam with respect to the probe tip (as well as the optimization of collection of light back-scattered by the probe tip) are conventionally performed in a manual, trial-and-error fashion. That is, understandably, time-consuming and prone to unknown and non-repeatable errors. An example of a typical error that the conventional optimization routine may produce includes the lack of an optimal alignment of a focused beam of light delivered from an optical source of the system (which, in the case of an s-SNOM system may be a light beam at mid-IR wavelength(s)) with respect to the tip. To address this shortcoming of the related art, at least one criterion of the optimal alignment according to the present invention is satisfied when a focal spot of illuminating beam of light is substantially co-incident with and centered at the probe tip (which corresponds to the tip being positioned substantially in a focal plane of an optical portion of the system delivering the illuminating beam of light to the tip). At this point in optimization of the alignment of the system, magnitude of the electromagnetic field incident on the tip is maximized and (other parameters of the system being the same) the collection efficiency of light back-scattered by the probe tip is most favorable for extracting the desired optical data. In addition or alternatively, in a specific case when the optics of the near-field system is refocusable (or zoomable), embodiments of the present invention may facilitate the finding of a local and/or global—minimum of the size of the focal spot of the illuminating IR light at the tip.

It was empirically determined by the inventors that the operation of commercially available and research s-SNOM systems that there exists a correlation between a practically-inconvenient and time-consuming manual process of optical alignment of a beam of light on the tip of the system's probe and a signal-to-noise ratio at which the aligned system operates. Such revelation identified a need in a system and method operable in a fashion of systematic optimization with respect to the alignment and focusing of the illuminating light on the probe tip of an s-SNOM system.

The idea of the invention stems from the realization that the conventionally reiterative and an operator-involved process of optical alignment of the near field optical system (such as s-SNOM/AFM system, for example) can be realized with the minimal participation of the operator (or, in some cases, even in a substantially operator-free fashion) by governing the optical alignment process driven by the results of evaluation of specific optical characteristics of spatially-complete or incomplete field-map(s) of a cantilever-tip. The field-map(s), required for evaluation of the identified optical characteristics, were formed in light re-radiated by a system's cantilever tip in response to such tip being targeted with the probe-illuminating beam. In a preferred implementation, that has been achieved by deliberately and intentionally making the tip and the focal plane of a probe-illuminating light beam spatially coincide.

In one instance, the problem of finding the optimal optical alignment between a mid-IR beam of light of the s-SNOM system and the cantilever tip, of the system's probe, that has been purposely illuminated with such beam is solved by determining such orientation and mutual positioning of the focal spot of such beam and the tip at which the focal spot coincides with and is centered at the tip (in which case the cantilever tip operates effectively as a point optical source or optical antenna) by scanning and/or refocusing the tip-targeting illuminating beam of light across the tip. According to an embodiment of the invention, while the process of the determination of the optimal alignment between the focal spot of the irradiating beam and the tip of the probe of the system can be effectuated while the irradiating beam is modulated, it is appreciated that, in general, the method of the invention does not require varying the power of the tip-illuminating beam. Moreover, in a specific implementation the optimal optical alignment is achieved without (in absence of) the modulation of the power of light incident onto the probe from the light source of the system. In this case, the method is devoid of varying the power of the tip-illuminating beam. In either case, it is notable that the method for determination of the optimal alignment—as well as the practical implementation of this method—is independent from and is not using any data representing the mechanical response, thermal expansion, photo-thermal response of the sample under test that is (mechanically) sensed by the probe.

In the process of the determination of the mutual orientation and positioning according to an embodiment, a complex-valued irradiance characteristic of the focal spot formed on the tip is being determined as a function of the scanning and/or refocusing of the tip-illuminating beam. This can be carried out with (an optionally repositionable) single-area detector, on which light, recombined from light portions traversing the reference and sample interferometric arms of the system, is converged with a use of a focusing element (such as a parabolic mirror, for example). A single-area detector may be a single-pixel detector (with dimensions of about 100 micros squared to about 500 microns squared), or a single-area detector with the area of up to 1 $mm^2$. For optimal performance in signal-to-noise, the size of the detector may be matched to the size of the beam focused on the detector. As a result, a field-map of the cantilever tip is populated with irradiance values representing a degree of confinement of the light beam on the tip of the probe (expressed, for example, as percentage of incident light that is focused on the tip), as well as changes in such degree of confinement as a function of the spatial displacement and/or refocusing of the illuminating beam with respect to the tip. It is also notable that, according to an embodiment of the invention, it is not necessary to complete a given raster scan (and obtain a complete 2D map of the field or a 3D volume set of such maps) but, instead, an embodiment of the invention may be effectuated by scanning one 2D slice of a field and also sampling the field along several lines that intersect the chosen slice (that is in a direction that is oblique or orthogonal to the slice). Alternatively, an embodiment may include only "sampling" the field along several intersecting lines in the slice (instead of carrying out a raster scan, to begin with), or/and sampling along a dynamically formed spatial trajectory, if a gradient search optimization is used.

The initial solution (the process of determination and the formation of field-map(s)) can be defined based on data representing the light signal (returned to the detector by the tip) at a fundamental harmonic of the vibration frequency of the probe. In another related instance, the initial solution to the problem is optionally additionally refined by configuring the process of determination of the mutual positioning between the focal spot of the irradiating light and the tip and the formation of field-map(s) at a higher (for example, the second and/or the third) harmonic of the probe-vibration frequency.

Embodiments of a System and Method

A simplified schematic of a near-field apparatus (s-SNOM, for example), structured to operate in a field-mapping fashion according to an embodiment 100 of the invention, is shown in FIG. 1. Here, a cantilever probe 110, in operable cooperation with the control circuitry 114 and used for profiling of a sample 118, is equipped with a tip 122. The interaction between the tip 122 and the sample 118 may be effectuated, for example, in a tapping mode (with the movements of the tip 122 substantially along the z-axis, as shown), and/or be generally contact, non-contact, near contact, intermittent contact as understood by a skilled artisan. In one implementation, a sensor system used to acquire optical data associated with the cantilever probe 110 includes a source of light 126, which in operation emits a beam 130 of light at an operational wavelength Such light is used for targeted illumination of the tip 122 through an optical system 134. The sensor system further includes an optical detector 138 (that may be chosen to be very small, for example a single-pixel detector), which is interfaced with the control-and-data-processing circuitry unit 142 (optionally equipped with tangible, non-transitory memory storage, not shown) and which receives a portion of the illuminating beam 130 that has been back-scattered and/or reflected from the tip 122. In an embodiment, the optical system 134 contains a component that changes a degree of spatial divergence of the beam 130 passing therethrough (such as, for example, a lens or a curved mirror), focusing a portion of the beam 130 onto the tip 122. It is appreciated that some incident light may, when not spatially optimized, also illuminate a portion of the sample 118 in the vicinity of the tip 122. Such parasitic illumination, while not intentional or purposeful, may be unavoidable depending on the specific parameters of the optical system 134. At least one of the control circuitry 114 and the circuitry unit 142 may include a computer processor specifically programmed to perform system-governing and data-collecting and processing functions discussed herein.

It is notable that according to one implementation, the sensor system is structured to utilize the same beam of light 130 to acquire both optical data representative of a degree of alignment of the beam 130 with respect to the tip 122 and/or that representative of a change in the spatial positioning of the cantilever probe 110 (for example, during the scanning of the sample 118 and without the need in and in absence of a visible guide-beam). The adjustments of the optical system 134, as a result of which the alignment of the beam 130 on the tip 122 is carried out, may include mutual lateral and/or angular repositioning between the beam 130 and the optical system 134 (to adjust a direction from which the beam 130 is incident onto the tip 122). Such adjustments may additionally include a longitudinal (axial) repositioning of the system 130 to (de)focus of the beam 130 with respect to the tip 122. Various spatial adjustments are effectuated for example with a set of micro-positioners (schematically indicated with arrows 146 and having sub-micron resolution, preferably on the order of 100 nm, even more preferably less than 50 nm) that are controlled by the circuitry unit 142 and, in particular, by the s-SNOM controller portion 142B of the unit 142. It is appreciated that in a specific case, the AMF controller 114 and the s-SNOM controller portion 142B can be combined in the unit 142. The range of translation of each micro-positioner along a corresponding axis is at least 100 microns, and preferably several hundred microns. (A larger translational range of at least several millimeters may be employed for flexible operation of the system 100 during the coarse alignment and for retraction of the focusing optics 134. The capability of a fast translation with the speed of at least several hundred microns per second is preferable for at least one axis of the positioner (the fast axis). For the purposes of this disclosure, the term "fast translation" refers to translation where the velocity of the translated element is higher than, for example, 50 microns per second (and in one implementation equal to several hundreds of microns per second). The "fast axis"(in a raster scan) is the axis that performs motion within each line of the raster; the "slow axis" is an (orthogonal) axis that moves in increments from one line to another, at a rate that is lower than that corresponding to the fast axis, as compared to motion from pixel to pixel within a line.

The beam 130, of light emitted by the optical source 126, is passed through a beamsplitter 150 that is configured as part of an interferometric set-up (for example, a Michelson interferometer) such that a portion 130A of the beam 130 is further directed to the tip 122 along a signal aim of the interferometric set-up, while another portion 130B is deflected to a reference arm 154 defined, in one implementation, by a reflective element 158 such as a mirror that is movable/repositionable along the beam 130B. (Alternatively or in addition to moving the reflective element 158, another methodology of varying an optical length of the reference arm can be implemented. For example, the optical length of the reference arm can be modified electro-optically, or thermo-optically, or acousto-optically, depending on the properties of optical material disposed for such purpose in the reference arm across the light beam.) An auxiliary focusing element (such as a parabolic mirror; not shown) can be placed across a beam that combines light from the reference and sample arms of the system and that that is incident onto the detector 138 to converge such "combined" beam of light onto the detector's sensitive area. The detector acts as a square-law (intensity) detector and produces voltage proportional to $\langle E_{ref}E^*_{sig}\rangle$, where $E_{ref}$ and $E_{sig}$ are optical fields in reference and signal arms, respectively. The detector 138 may be spatially-repositionable for a specific purpose of adjustment of the focusing of the beam from the interferometer portion of the system onto the detector.

A specific embodiment of the system of the invention is configured to be operated at power levels that are certainly not sufficient to result in any operationally undesirable change in the near-field signals, caused by expansion of a material due to increase in temperature and acting as a source of noise. The specific embodiment of the system operates well below such levels. As alluded to above, in contradistinction with a methodology discussed in related art, the data representing expansion of the sample is not required to determine the near-field signal. In one specific instance, the linear expansion of a dimension of the sample 118 under the tip 122, caused by parasitic absorption of light 130A incident onto the sample 118 in the vicinity of the light spot on the tip 122, is below 2 nm. In such non-limiting example, the operational value of the peak power of the beam 130 of FIG. 1 may be below 20 mW with the resulting irradiance, at the tip 122 of about and/or less than 0.625 mW/micron$^2$. The latter can be shown to cause a deflection force of less than 5 nN (experienced by the cantilever 110 when the focal spot of the beam 130A is coincident with the tip 122.

According to embodiments, the complex-valued s-SNOM data (which may be, at the same time, multivariable in that it include complex-valued amplitude/phase sets of data representing the results of demodulation of the detected signal at the $1^{st}$, $2^{nd}$, $3^{rd}$ harmonics of the frequency of the probe vibration, and, optionally, the results of the DCSD measurements) can be obtained from the values of irradiance interferometrically acquired at the detector 138 at different lengths of the reference arm 154. For example, both the amplitude and phase values can be calculated from two data sets taken, respectively, at two lengths of the reference arm the difference between which is equal to about one-eighth of the operational wavelength $\lambda$ (i.e., in a two-phase homodyne mode). The optical path in the reference arm 154 can also be modulated when the mirror 158 is repositioned in a periodic pattern (corresponding to, for example, sinusoidal wave, triangular wave, or a combination of pre-defined step functions). It is appreciated that the optical path difference OPD between the reference arm 154 and the signal arm of the interferometric set-up is affected by the axial and/or transverse repositioning of the focusing element 134, which is accompanied by the change of the spot formed by the beam 130A on the tip 122.

In one implementation, the probe 122 is vibrated, in operation, at a frequency $\Omega$ that is substantially close to its resonance and is held in operational feedback in close proximity to the sample 118 by the AFM controller 114. Such AFM-type operation of the system 100 is referred to herein as "tapping mode" or "intermittent-contact mode". The incident light 130B that has scattered from the tip apex (and, possibly, probe shaft, and sample under test) is collected, as light 162, by the same optics 134 and is further interferometrically recombined with the reference beam 130B. The resulting interferometric fringes form a far-field distribution of irradiance in a plane where the detector 138 is located. (Interferometric recombination, as will be understood by a skilled artisan, causes an interference phenomenon between waves being recombined and results in an interference pattern used to make accurate empirical determination of a parameter representing a physical characteristic of at least one of the waves being recombined and/or the measurement system involved.) The so-formed far-field irradiance distribution, is sensitive to and depends on the near-field optical wave of the vicinity of the tip 122 and the sample 118, and includes radiation containing the information about such near-field optical wave. Alternatively or in addition, an optical field of the so-formed far-field distribution of irradiance contains a component used to ascertain the interaction between the tip 122 and the beam 130A incident onto the tip 122.

As a result of scanning of the focusing element 134 the field-map or image is being formed. The terms "field-map" and "image" as used herein refer, interchangeably, to an ordered representation of signals produced by an optical sensor (in one case—an optical detector) corresponding to spatial positions. For example, in case of a single-pixel detector, optical data acquisition is carried out in a raster scan mode, and the field-map is formed by associating optical irradiance values with point-by-point spatial positions corresponding to the raster scan. For example, in reference to FIG. 1, a field-map may be an array of values within an electronic memory (such as, for example a two-dimensional array 166 or a three-dimensional array 170), and/or a visual image or field-map may be formed on a display device 174 such as a video screen or printer.

The output of the detector 138, caused by the acquisition of the irradiance pattern, is processed by a signal detection algorithm implemented in the s-SNOM controller 142B with the use of, for example, specific program code containing appropriate instructions to the controller 142B. The signal detection algorithm is structured to determine the strength of the near-field-related component of the backscattered light 162. Additionally, the phase of this light component 162 (with respect to that of the reference beam light returned towards the detector 138) is determined. Examples of such signal detection method are provided by a lock-in demodulation procedure at harmonics of tapping/vibration frequency $\Omega$ ($2\Omega$, $3\Omega$, . . . ), a Fourier analysis determining these harmonics, and/or an alternative technique devised to achieve the specified goal. For example, the relative phase of light in the reference arm 154 can be modulated by oscillating a position of the mirror 158 with a piezoelement at a chosen frequency (for example, from about 100 Hz to about 2 kHz) and with a chosen peak-to-peak amplitude (for example, within a range from a portion of a wavelength to an amplitude exceeding one wavelength such as, in one specific example, from about one-eighth of a wavelength to about one-quarter of a wavelength). The effect of such modulation on the second-harmonic (2Ω) component is detected with another lock-in amplifier operating at the frequency equal to the frequency of modulation of a mirror-position, in comparison with methodology discussed by Stebounova et al. in "*Enhancement of the weak scattered signal in apertureless near-field scanning infrared microscopy*", Rev, Sci, Instr., v. 74, no. 8, 2003.

It is appreciated, therefore, that at least a one-dimensional (1D) or, more generally, multi-dimensional scanning (such as two-dimensional, 2D, raster scanning optionally combined with the refocusing) of the optical system of an embodiment of the invention leads to acquisition, analysis, and/or visualization of 2D and 3D data arrays representing spatial distribution(s) of the optical field in the focal plane at least in part caused by the tip 122 of the cantilever of the s-SNOM system. A direction of scanning of the optical system with the use of the positioners 146 can generally follow an arbitrary trajectory (whether 2D or 3D), while the scan resolution, defined by the spatial increment(s) of such repositioning, may be generally non-uniform and/or changeable during the scanning procedure. For example, as mentioned above, one 2D slice can be scanned, complemented by sampling of the signal along several lines that intersect such slice. Alternatively, the field could be sampled along several intersecting lines in the slice (instead of performing a raster scan), or sampled along a dynamically-formed spatial trajectory if a gradient search optimization is used (providing the optimization along the shortest path). Depending of the specific implementation of the invention, the field-mapping procedure can be automated in part (semi-automated) or substantially fully-automated. During the automated portion of the procedure, a number of slices can be scanned, local maxima of the signal can be found, and (optionally annotated) image(s) can be presented to the user. During the following manual portion of the procedure, the user selects a position on top of one of the local maxima (for example by double-clicking on the image).

According to one embodiment, and generally independent from the degree of automatization of the procedure, a flow of the field-mapping procedure can include the acquisition of image(s), of the focal spot of the illuminating beam of light at the tip 122, at different harmonics of the tapping/vibration frequency of the probe. It is recognized that the optical signal returned towards the detector at the first harmonic of the probe-vibration frequency is usually the strongest (contains significant background contribution), while the components of the signal demodulated at the second and/or higher harmonics of the tapping frequency are weaker and are characterizing by progressively increasing ratio of near-field vs. background contribution). Accordingly, an image of the near-field optical irradiance distribution can be formed with the use of the demodulation at the first harmonic of the frequency Ω at which the probe is vibrated. The beam 162, which includes light back-scattered by the probe (and sample under the probe), is collected by the lens 134. The collected light has components or portions that are modulated by the vibration of the probe (and an unmodulated component, mostly background). A skilled artisan would appreciate that, among the modulated components of the beam 162, the component modulated at the fundamental frequency Ω includes not only a component containing purely sought after information about the near-field optical wave returned by the tip 122, but also a strong background component. The latter may result from the scattering of the illuminating light 130A by the other areas of the probe 110 (and, possibly, the sample 118) and with which such pure tip-related near-file optical wave is convoluted. The components of the collected light extracted at the $2^{nd}$ and higher harmonic are progressively weaker but have a higher ratio of near-field vs. background information contribution.

Figure 2:
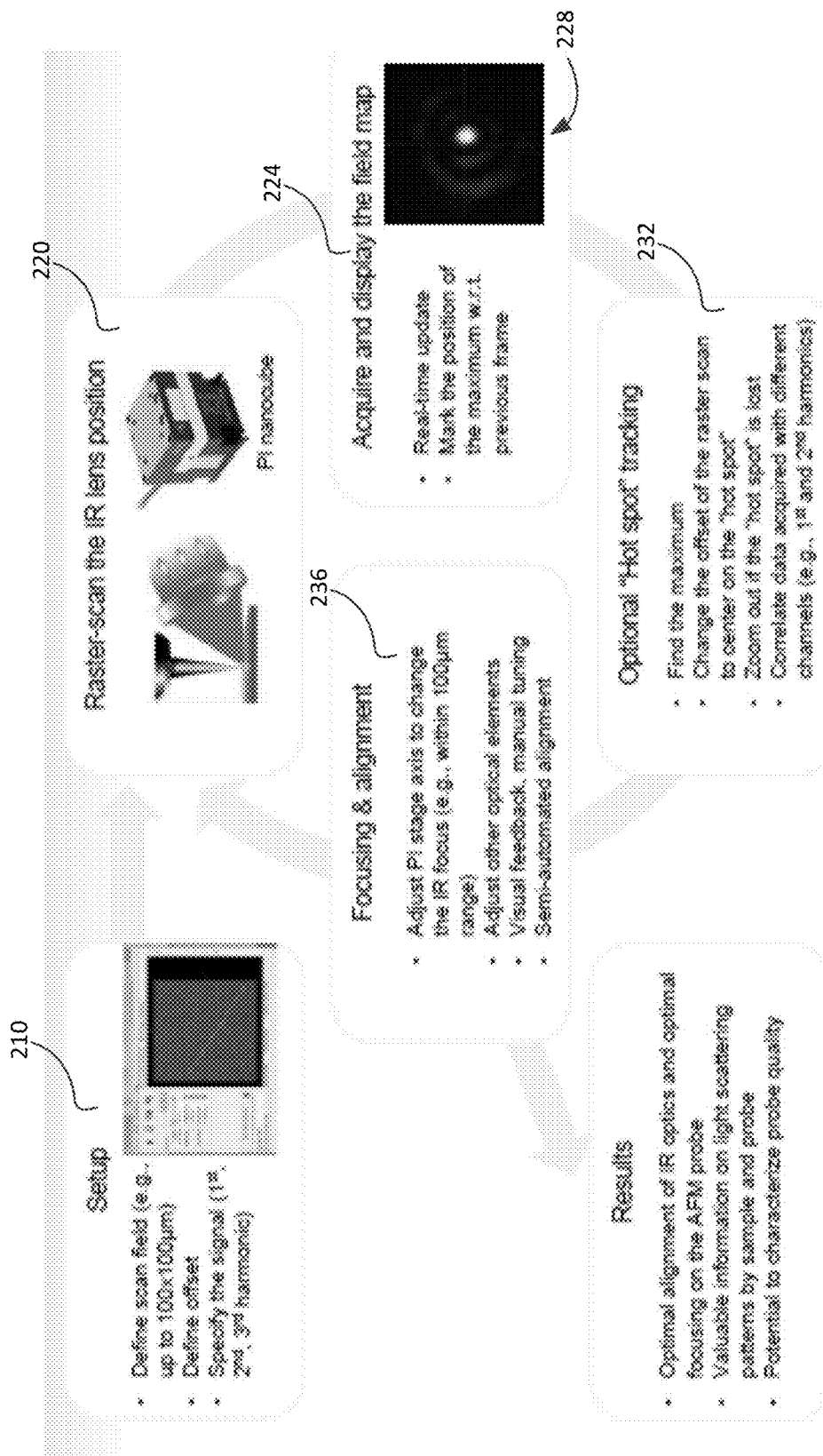
FIG. 2 is a simplified flowchart illustrating the use of the field-mapping method in semi-automated fashion according to an embodiment of the invention.

In reference to the schematic flow-chart of FIG. 2 and in further reference to FIG. 1, at step 210 the parameters of the field-mapping process of the invention are being set-up by defining, in part, a spatial range of mapping (for example, by the spatial extent of a raster scan of 50 by 100 microns slice, and 20 slices with 10 micron spacing therebetween), a spatial offset of the spatial range (spatial coordinates of each slice with respect to the origin of the positioned, and the central slice position along the optical axis), as well as a frequency range at which the mapping output will be determined. A data frame (or set of data) characterizing the distribution of the optical field a the focal spot of the tip-illuminating beam within the specified spatial range of mapping is acquired, as a result of scanning 220, with the system of the invention such as the embodiment 100 of FIG. 1, at step 224 to create a 2D field-map 228 with the use of the circuitry unit 142 of FIG. 1.

Optionally, at step 232, a spatial position of the maximum of the irradiance distribution across the acquired field-map 228 is being determined (whether manually or automatically) and stored in a tangible storage memory unit in association with the number of the current data frame corresponding to the current field-map 228.

The re-centering of the current field-map is followed, at step 236, by spatial re-adjustment of the optical system 134 with respect to the tip 122 (which may include refocusing of the system 134 according to the set-up parameters defined at step 210) and the acquisition of the next data frame/field-map (re-iteratively, at steps 220, 224) to obtain a map in which the maximum, determined at step 232, is positioned in the central portion of the map. Optionally, for each of the acquired field-maps, a position of the current maximum of the irradiance distribution is compared with and/or marked with respect to the corresponding position of the maximum in the previously-acquired field-map. A stack of field-maps, in the form of a 3D image of the irradiance distribution corresponding to a focal spot of the beam of light on the tip 122, can be also created with the purpose of characterizing the distribution of irradiance in 3D, and finding the "waist" of the focused light beam.

As a result of the field-mapping process, the optical data representing complex-valued physical parameters is acquired, which contains information useful for optimized alignment of the probe tip 122 and the illuminating beam 130A and coded in both amplitude and phase. Accordingly, visually-perceivable representations of field-map images in both amplitude, (or irradiance) and phase may be employed to facilitate the analysis of light-scattering patterns in search for the optimal focus of the beam 130A. For example, as would be understood by a person of ordinary skill in the art, as the optical system is being adjusted and aligned to more and more confine the illuminating beam 130A on the surface of the tip 122, the reiteratively-acquired field-maps reflect improvements in such confinement by displaying irradiance patterns converging to an irradiance pattern corresponding to a diffraction limited pattern and, in particular, to at least a central lobe of the airy-pattern (formed by scattering of the beam 130A at its focal point by the tip 122 of the probe 110, which is the ought after optical signal). Such irradiance images display characteristics of an Airy-disk-like pattern, and at least for that reason can be distinguished from other irradiance patterns of light-scattering (such as patterns produced by scattering of the incident beam 130A on an elongated object—a cantilever of the probe, for example, which would correspond to a sub-optimal optical alignment situation when the background optical component of the returned beam 162 is sufficiently strong).

In other words, the progress in spatial alignment between the illuminating beam 130A and the tip 122 is achieved by discriminating between the field-maps the amplitude portions of which contains characteristics of an Airy-disk pattern and those that do not, and causing the optical system to align in a direction that results in a well-defined Airy-disk-pattern-like amplitude portion of a field map. In some cases, the circular pattern of an Airy-disk like field map may be more pronounced in a phase portion of the field-map while being not as noticeable in the amplitude channel. Therefore, the proper optical-system-tip orientation procedure may include the analysis of both amplitude and phase field maps to find the optimal position of the focus of the beam 130A on the tip 122.

Referring now to FIGS. 3A, 3B, 3C show examples of 2D field-maps procured with an embodiment of the field-mapping procedure as discussed and displayed as irradiance distribution maps at the display device 174). FIGS. 4A, 4B, 4C provide 3D renderings of the 2D field maps of FIGS. 3A, 3B, 3C. IN particular, a field-map acquired at the fundamental harmonic of Ω (shown in FIGS. 3A and 4A) corresponds to an irradiance pattern with multiple local maxima, while field-maps acquired at second or third harmonics of Ω (shown, respectively, in FIGS. 3B, 4B and 3C, 4C) demonstrate pronounced Airy-pattern representations of the optical field on the tip 122 as the optical alignment of the system 100 is iteratively improved.

According to one implementation of the invention, a field mapping procedure, whether semi- and fully-automated, can be structured according to a hierarchical sequence (a sequence of multilevel, gradual refinement procedure) by applying different signal detection schemes (which may vary in sensitivity and specificity to the near-field component) at each level of the hierarchy. For example, the s-SNOM data representing scattered light intensity that is stronger and more readily detectable with the use of the demodulation at the fundamental frequency Ω above the noise level (~high SNR) but that is contaminated with background contribution (and is, for that reason, less specific to or representative of the south after near-field component corresponding to light scatter by the tip itself) can be used for a large-range scan and/or search, that is, while the coarse spatial alignment and/or focusing is in progress. Due to background interference, field maps formed at this 1st level of hierarchy can reveal several local maxima and patterns that are substantially different from an Airy disk-like pattern. Field-mapping-based identification of the optimal alignment of the system can be further refined for these local maxima at the following, higher levels of the procedural hierarchy, to distinguish the optimal alignment from false results. Such further levels of the hierarchy can use signal detection that is more specific to the near-field component and has better rejection of the background, e.g., demodulation at 2nd, 3rd, or higher harmonic.

In a semi-automated mode, for example, when a field map displayed on the device 174 presents a pattern with one or several local maxima (see, for example, images of FIGS. 3A, 4A), an actions is taken by an operator to re-center the scan area on the chosen point of the field map with the use of program code used to program at least a portion of the circuitry unit 142 of FIG. 1. Such re-centering can be effectuated by, for example, identifying an image pixel of the field-map of FIG. 3A that corresponds to such image point of choice with a computer pointing device (such as a mouse, for example) and zooming into or zooming out of the scan range by drawing a box-like borders around the chosen area of the displayed image. Accordingly, an operator is provided with the opportunity to perform the necessary adjustments by using field-map frames as a visual feedback or a characteristic pattern for the diagnostics of the system of the invention. Based on the field-map appearance, the operator can detect and correct alignment problems in real-time. This procedure is starkly contradistinctive to the procedures employed to-date in the art, according to which the manual alignment of the s-SNOM system is governed by the continuous readout of the detector's output (and maximization thereof), and where 2D and/or 3D representations of the irradiance distribution are not acquired and not presented for the analysis of the pattern.

When various parameters of the optical setup (such as collimation of the laser beam on the tip 122, alignment of the beam splitter 150, angular alignment of the focusing lens 134 with respect to the beam 130A) are being adjusted, it may be desired to acquire and display field-maps continuously and continually to allow the operator to observe the pattern changes as a function of the alignment procedure in real time. In addition, the computer-assisted tracking of the "hot spot" (a chosen maximum in the signal) may be employed to perform an automatic field-map centering and automatic control of the scan range. The field maps (optionally, auto- centered and auto-ranged) are displayed to the operator, who can use them as visual guidance while he/she adjusts the alignment of the optical system elements that are not necessarily motorized (some other elements that are not shown in FIG. 1). The focusing element 134 is motorized with positioner 146, so a fully-automated procedure that involves the final alignment and focusing of 134 can proceed without operator's input and without displaying maps as a visual feedback.

In a different situation, a fully-automated procedure can be employed as an embodiment of a method of the invention. Such algorithm is configured to conduct automatic search of the optimal targeted focusing of the illuminating beam on the tip 122 of the system of FIG. 1 by employing various spatial sampling/scanning trajectories and efficient optimization techniques known in the related art. For the optimization task at hand, where a 3D position of the focusing element 134 of FIG. 1 constitutes three independent variables, the function value is related to a (complex-valued) measurement data at such 3D position and minimization of time required to achieve the optimization of the alignment of the beam 130A with respect to the tip 122. The time-efficiency of an automated optimization procedure is determined by the total number of sampled positions, the trajectory that traverses these positions, and the speed of motion along this trajectory. (The optimization algorithm determines the multiplicity of spatial positions: the positions of the maximum of a function $F(x,y,z)$, where F is the signal and x,y,z are spatial variables. An optimization procedure iteratively determines a multiplicity of function arguments $\{x,y,z\}$ based on function values at previous steps/positions, either deterministically (e.g., gradient search) or with stochastic elements (some randomization).

The important distinction of a field-mapping optimization algorithm according to the invention from a generic computational optimization algorithm stems from the emphasis on optimization of the travel trajectory and minimization of the travel path that connects the sampled positions of the focusing element 134. Although a method for field-mapping optimization utilizes traditional some of the developed optimization approaches, additional heuristics and/or path selection strategies are introduced in order not only to keep the number of spatial sampling points as low as possible, but also to allow for fast transition between such sampling points. In contradistinction with embodiments of the invention, in generic, conventional computational optimization problems used in related art the function evaluation/computation is usually expensive and, therefore the total number of evaluations/samplings is sought to be as low as possible; at the same time, however, the relative position of and/or the distance between sampling points in the variable space is usually not a concern and a transition from one value of independent variable to another is a cost-free operation.

In one implementation, a direct alignment-optimization approach can be realized by performing a raster 2D or 3D scan with resolution and sampling of the scattered light irradiance at each position of the raster scan that are sufficient for spatially resolving the wavelength-dependent field pattern in the focus spot. Such scan or raster s followed by the determination of the global optimum and/or a number of local maxima (with the use of, for example, a Quicksort algorithm; or Hough transform). If the scanning of the chosen spatial region is carried out at high speed and/or the region to be mapped is not too large, then such "brute-force" optimization can be efficiently completed in a reasonably short time. In addition, data from a 2D field map or 3D volume/stack of maps can be stored and analyzed for signal patterns, which can provide useful diagnostic information and characterize the s-SNOM scattering quality of the probe. On the other hand, if the time required for a detailed 3D or 2D raster scan of a large region to be mapped is operationally prohibitive, then a coarse raster scan at a decreased spatial resolution (resulting in a reduced number of sample data points) can be used instead as a pilot scan for finding a good initial starting point used for a more sophisticated optimization algorithm. The time required for a coarse probing of the field at the chosen area will be primarily determined by the mechanical capabilities of the positioner (a mechanical motion factor) and, to a lesser degree, by the speed of signal acquisition (an "integration time constant"). Therefore, a coarse probing of the field can be performed much faster (full speed) than a detailed scan of the same region of space (slow down for data acquisition).

In a related implementation, and optionally as an alternative to the direct optimization approach (and, preferably, for use with an embodiment employing a fast automated alignment procedure), a uniform raster scan can be replaced with a search trajectory across the spatial range of mapping (that has been defined at step 210 of the method of the invention). This trajectory is chosen to efficiently assess the required number of sampled positions (i.e., function evaluations) and the travel time/path length connecting these positions to minimize these values. In devising the required search trajectory, the next position or positions of the focusing element 134 is/are determined dynamically based on the value(s) of complex-valued measurement data acquired at previous position(s) of the focusing element 134. (As compared with the direct approach, which samples the signal/function at all grid points in a raster scan/volume, and then determines the maxima from the dataset/image, the dynamic method determines a point in the sampling trajectory based on signal/function values at previous locations and contrary to static, predefined positions in a raster scan of the direct method.) In this context, an embodiment of the alignment-optimization algorithm provides a recipe of how the following positions are determined and the condition when the search is deemed completed or abandoned (based, for example, on a pre-defined convergence or exit criterion). An algorithm can be structured to define the following position(s) of the focusing element in a deterministic fashion or a stochastic fashion. For example, an algorithm of the invention according to which a following position of the focusing element is determined based on its previous position(s) can be structured to use previously obtained measurement data points to evaluate spatial derivatives of the complex-valued data (first derivatives to form a gradient vector, second derivatives to form a Hessian matrix). Such algorithm is further referred herein as a derivative-based algorithm. Alternatively, an algorithm can be structured to operate without the use of derivative information (a derivative-free algorithm).

An example of deterministic derivative-based algorithm that can be used with the described procedure is the Steepest Descent/Gradient Descent method described, for example, in "Numerical Recipes" by Press et al. For complex-valued optical signals acquired according to the field-mapping method of the invention, the optimization target may be defined as the finding of the extremum of the amplitude of the optical signal at the detector 138, while phase information corresponding to such signal can provide additional constraints such as smoothness and/or continuity of transition between the immediately neighboring spatial positions of the focusing element 134. (Understandably, either the maximization or minimization procedure can be used for this purpose. Similarly, "descent" and "ascent" terms in determining the steepest change of the chosen trajectory can be interchanged for minimization and maximization tasks, respectively. Further use of terminology appropriate for minimization tasks, which is generally accepted in the optimization field and literature, implies that a correct meaning with respect to maximization/minimization can be easily inferred.) In the context of the field-mapping process of the invention, the Gradient Descent automated procedure iteratively estimates the gradient vector from several local measurements of the strength of the optical signal, and then, with the use of the circuitry unit 142, activates a positioner 146 to effectuate a movement of the optical element 134 in the direction associated with and defined by the gradient vector. The estimation of the gradient requires the positioner 146 to perform several small displacements of the element 134 in orthogonal directions (in 2D or 3D), while the numerical differentiation of optical signal values acquired at the detector 138 and associated with such displacements provide input data to the estimate the gradient of a change of the acquired optical data. The size of the gradient descent step can be adaptive in order to minimize noise-induced random walk and backtracking, and fulfill the goal of minimizing the total path length. For example, a heuristic procedure can adaptively select the step size based on gradient strength, signal magnitude, and the signal to noise ratio. Adaptive step size selection procedure can be based on approaches known in the art, including but not restricted to Trust region methods, Neural Network and Backpropagation training, Barzilai and Borwein's approach, for example.

An example of a stochastic derivative-free algorithm is provided by the Simulated Annealing process (see "Numerical Recipes" by Press et al.). In the Simulated Annealing approach, a transition into a next state (for example, to the next position in the variable space) is performed randomly (described as a random walk in a state space), while probabilities of transitions are updated based on available output function evaluations. While Simulated Annealing can perform downhill steps similarly to the Gradient Descent, it can also walk against (in a direction opposite to that defined by) a weak gradient, which facilitates the ability of the algorithm to avoid providing a false solution that is "trapped" in a region associated with false noisy local extrema. For the field-mapping procedure of the invention, the chosen algorithm must be modified with additional heuristic in order to minimize the total length of the random walk path. Such algorithm can be based on approaches known in the art, including but not restricted to Adaptive Simulated Annealing, thermodynamic simulated annealing, Very Fast Simulated Reannealing, for example.

In one embodiment of an automated field-mapping method, the optimization algorithm is a specialized variant of a trust region optimization procedure. For example, one embodiment may combine the trust region algorithm NEWUOA, ("New Unconstrained Optimization Algorithm" developed by J.D. Powell, known in the art) with Dijkstra's shortest path search algorithm, which is embedded in each iteration of the NEWUOA. In each iteration, the NEWUOA algorithm fits a quadratic model using M=2*N+1 function evaluations (2D: N=2, M=5 positions; 3D: N=3, M=7 positions), and Dijkstra's shortest path algorithm is used to find the shortest trajectory connecting these M points where the signal is measured. The quadratic model is used to predict the position of the optimum, and new M points are selected (within a trust region, therefore not allowing jumps that are too far along the quadratic model's surface, contrary to Newton's optimization method) for next iteration. Iterations of NEWUOA trust region quadratic model fitting with Dijkstra's shortest path planning are repeated until the convergence criterion is satisfied. The NEWUOA algorithm provides a very conservative approach with respect to the number of function evaluations/sampling positions, and Dijkstra's algorithm minimizes the length of travel trajectory between sampling positions. As a result, the preferred embodiment algorithm is capable of achieving efficient and fast results in automated field-mapping procedure.

Examples of Field Maps Empirically Obtained with the Use of an Embodiment

FIGS. 5 through 16 present examples of field maps acquired with the use of an embodiment of the present invention.

Figures 5A, 5B:
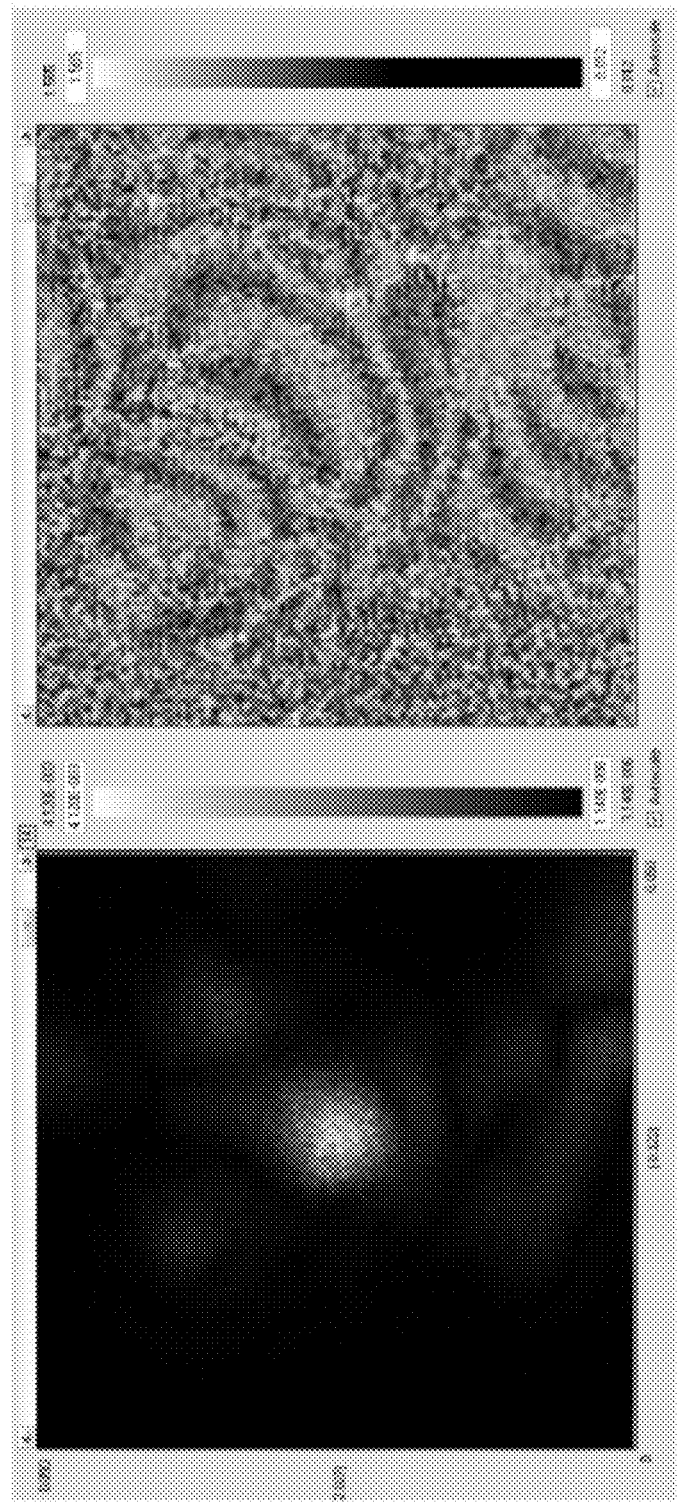
FIGS. 5A and 5B are images of the amplitude and phase portions of a field map pattern obtained with an embodiment of the present invention and with the use of demodulation of the optical signal at the first harmonic of the frequency of vibration of the probe.

The amplitude field map of FIG. 5A and the phase field map of FIG. 5B were obtained with demodulation of the optical signal 162 at the $1^{st}$ harmonic (fundamental frequency) of the frequency of the vibration of the probe 100; the probe was held in feedback and engaged to a surface of the sample 118. The Amplitude image of FIG. 5A shows several local maxima. The Phase image of FIG. 5B exhibits a pattern with a non-trivial superposition of fringes, where no single distinct point source can be discerned from a concentric pattern. From these data, a skilled artisan discerns that 1) the contribution of background field at $1^{st}$ harmonic conceals the near-field coupled field pattern representing a lobe of an Airy disk and that 2) the $1^{st}$ harmonic signal is stronger than signals obtained due to demodulation at higher harmonics of the probe vibration frequency and, for that reason alone, can be used for initial alignment of the set-up 100. FIGS. 5A, 5B also show that 3) Phase map information is complimentary to the Amplitude field map, but at $1^{st}$ harmonic the Phase map does not contain a clear pattern of concentric fringes, and therefore is not likely to facilitate the location of the focal spot of the beam 130A on the tip 122.

Figures 6A, 6B:
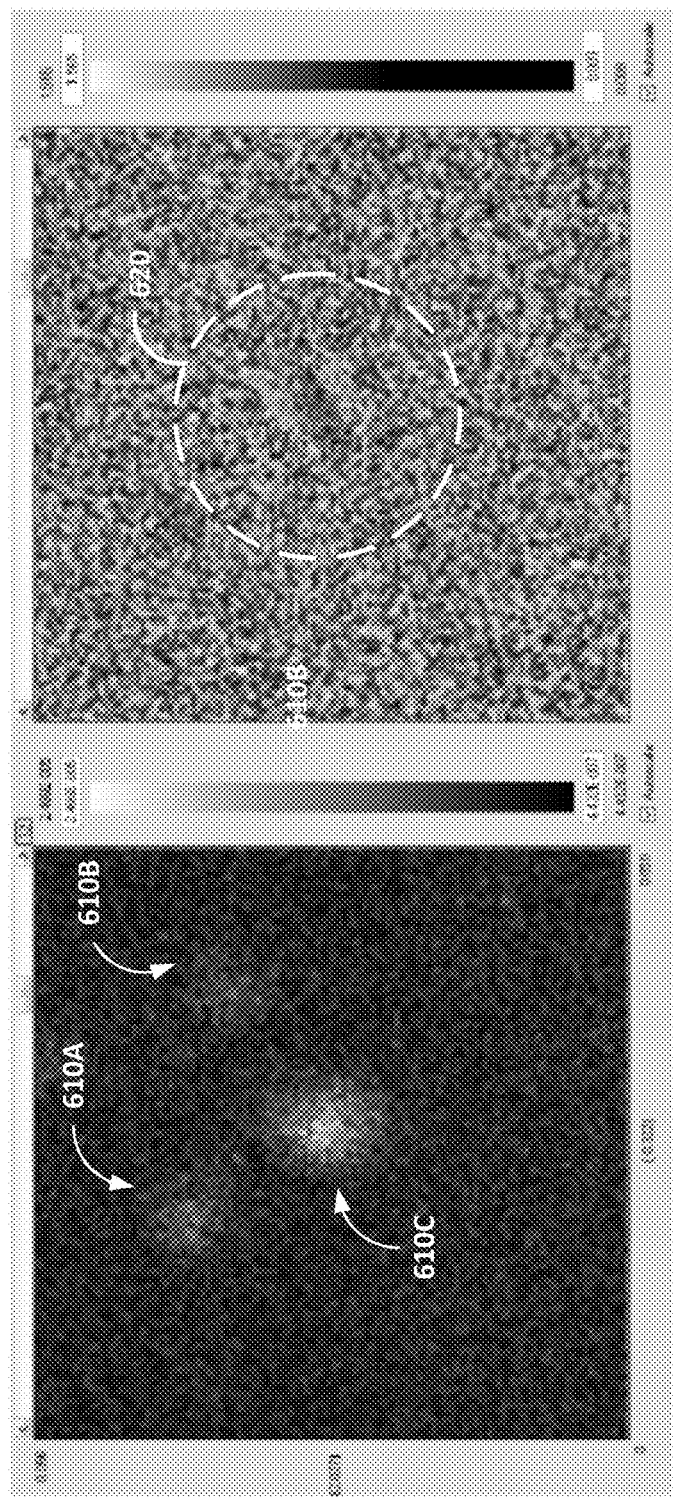
FIGS. 6A and 6B are images of the amplitude and phase portions of a field map pattern obtained with an embodiment of the present invention and with the use of demodulation of the optical signal at the second harmonic of the frequency of vibration of the probe.

Example of a field map obtained by demodulating the optical signal (received in back-scattered of light 130A from the probe 110 by the detector 138) at the $2^{nd}$ harmonic of the probe vibration frequency in FIGS. 6A, 6B. Here, the optical data was acquired while the probe 110 was held in proximity to a sample surface but not in feedback, that is, not sufficiently close for the near-field coupling between the tip 122 and the sample 118. The Amplitude portion of the field map. Shown in FIG. 6A, illustrates several local maxima 610A, 610B, 610C. The Phase portion of the field map of FIG. 6B shows subtle fringes (encircled as 620) in the center, where no single distinct point source can be discerned from a concentric pattern. The example in these Figures illustrates illustrate that 1) the contribution of background field (that is, an optical signal not related to the near-field) at the $2^{nd}$ harmonic of the probe-vibration frequency, while present, is smaller compared to that at the $1^{st}$ harmonic of the probe-vibration frequency shown in FIG. 5A; 2) the amplitude portion of the field map obtained at the $2^{nd}$ harmonic of the probe-vibration frequency can exhibit several local maxima; and that, 3) while the Phase map information is complimentary to the Amplitude field map, at the $2^{nd}$ harmonic of the probe-vibration frequency and in absence of near-field effect, the Phase field map does not necessarily contain a clear pattern of concentric fringes, and therefore still does not facilitate locating the focal spot of the beam 130A.

Figures 7A, 7B:
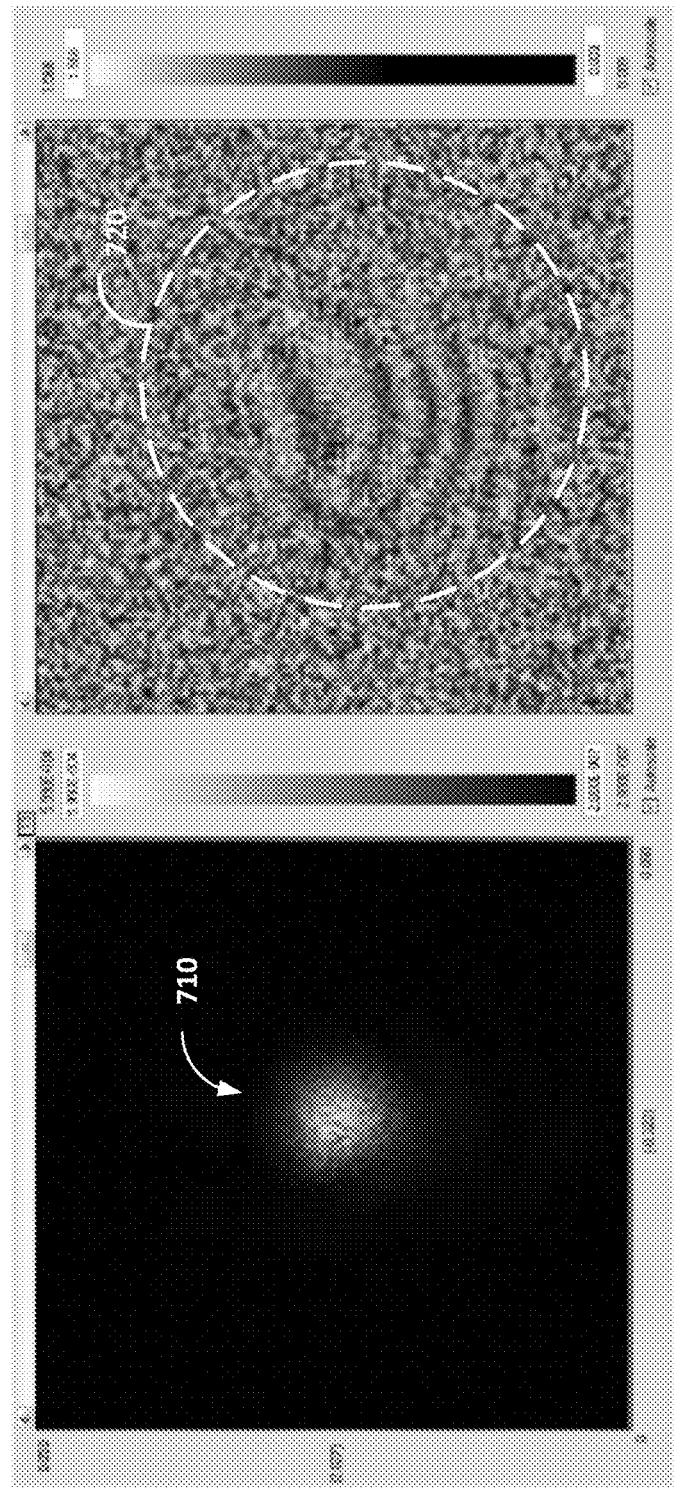
FIGS. 7A and 7B are images of the amplitude and phase portions of a field map pattern obtained, under conditions differing from those corresponding to FIGS. 6A, 6B, with an embodiment of the present invention and with the use of demodulation of the optical signal at the second harmonic of the frequency of vibration of the probe.

Example of a field map obtained with demodulation of the acquired optical signal at the $2^{nd}$ harmonic of the frequency of the vibration of the probe (which probe was held in feedback and engaged to a sample surface, that is, located sufficiently close to the sample surface for the near-field coupling between the tip and sample to occur) is shown in FIGS. 7A and 7B (amplitude and phase portions, respectively). The Amplitude image of FIG. 7A shows one distinct maximum 710, which is interpreted a center of the Airy pattern. The Phase image of FIG. 7B shows fringes (encircled as 720 in the center of the image) with a distinct concentric pattern. This example illustrates that 1) the contribution of background field (shown in FIG. 6A) to the optical signal acquired at the $2^{nd}$ harmonic of the probe-vibration frequency is much smaller compared to the near-field contribution; that 2) the $2^{nd}$ harmonic Amplitude map can exhibit one strong local maximum without readily observable side-lobes, while the center of the Airy pattern may be not easily identifiable; and that 3) the Phase map information is complimentary to the Amplitude field map, and, at the $2^{nd}$ harmonic of the probe-vibration frequency and in presence of near-field effect, the phase portion of the field-map contains a clear pattern of concentric fringes, which allows for the unambiguous localization of the focal spot of the beam 130A.

Figures 8A, 8B:
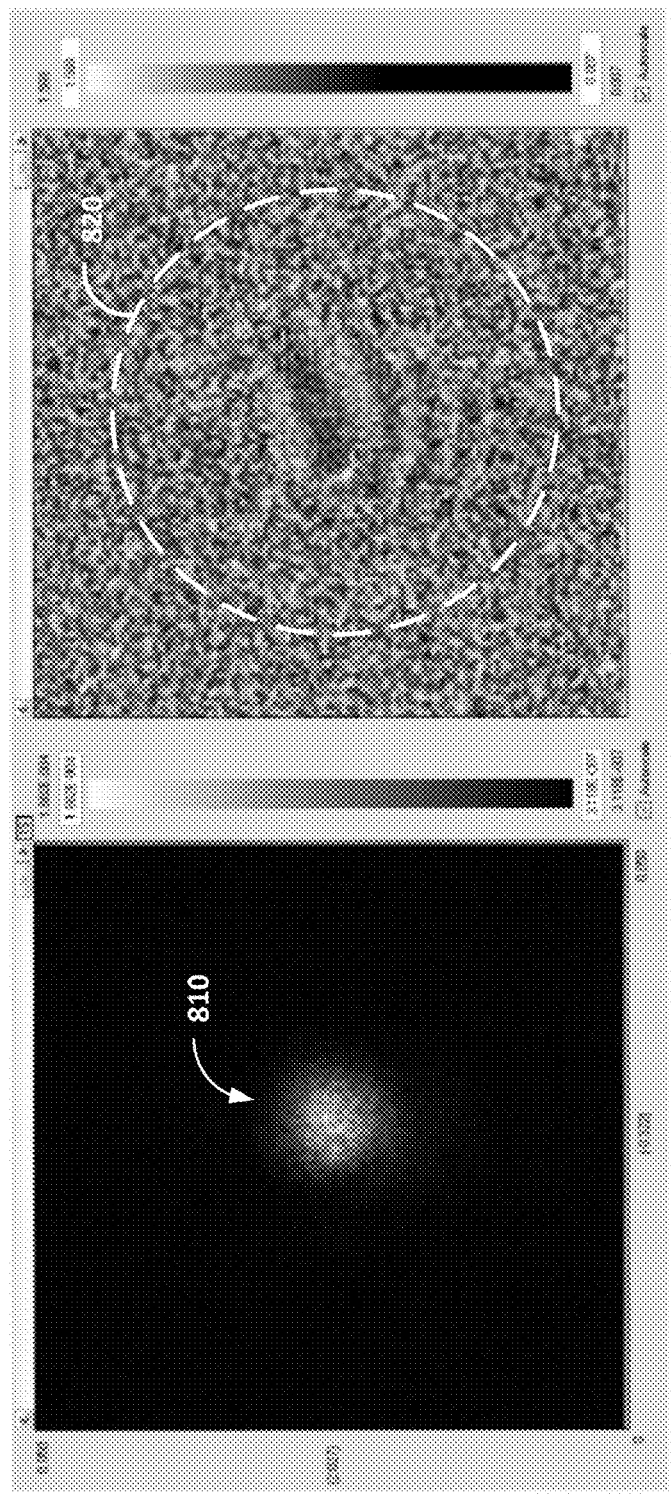
FIGS. 8A and 8B are images of the amplitude and phase portions of a field map pattern obtained with an embodiment of the present invention and with the use of demodulation of the optical signal at the third harmonic of the frequency of vibration of the probe.

Amplitude and phase portions of a field map shown in FIGS. 8A, 8B, respectively, demonstrate the results of the demodulation of the acquired optical signal at the $3^{rd}$ harmonic of the probe vibration frequency. Here, the probe was held in feedback and engaged to a sample surface, that is, sufficiently close for the near-field coupling between tip and sample. The Amplitude image of FIG. 8A shows one distinct maximum 810. The Phase image of FIG. 8B shows fringes 820 in the center of the image with a distinct concentric pattern (that is distorted, stretched in vertical direction of the image). These results illustrate that 1) the contribution of background field at the $3^{rd}$ harmonic of the probe vibration is small compared to the near-field contribution shown in FIG. 5A, and therefore only one local maximum is present in FIG. 8A; that 2) the side-lobes of the Airy pattern of the Amplitude map procured at the 3rd harmonic of the probe vibration may not be readily observable, and the center of the Airy pattern may be not easily identifiable; that 3) the Phase map information is complimentary to the Amplitude field map, and, at the $3^{rd}$ harmonic of the probe-vibration frequency and in presence of the near-field effect, the phase portion of the field map contains a clear pattern of concentric fringes, which, together with the amplitude map of FIG. 8A, allows for locating unambiguously the center of the focal spot of the beam 130A.

Empirical results procured with an embodiment of the invention are illustrated in FIGS. 9A, 9B. Here, a map of 100-by-100 micron field is shown, obtained by demodulating the acquired optical signal at the $1^{st}$ harmonic (fundamental) of the probe vibration frequency. During the acquisition, the probe was held in feedback and engaged to a sample surface. The Amplitude portion of the field map exhibits two elongated maxima 910A, 910B that can be explained by light being incident at and backscattered by the sides of the cantilever. The Phase image of FIG. 9B shows two sets of elongated parallel fringes, from which no single distinct point source is likely to be discerned. The example in these Figures illustrates that 1) probing the field by a point-like scattering source (that is, by the tip coupled to a sample in near-field), is essential for accurate mapping of the field at the focus of the illuminating light beam, whereas probing with a scattering object of finite linear dimensions (such elongated cantilever) does not represent the true spatial distribution of the focused optical field; that 2) the presence of elongated features in field maps at the $1^{st}$ (or, for that matter, higher harmonics) reveals outlines of a cantilevered probe, and therefore can be useful for initial crude alignment of the focused beam on the probe tip; and that 3) Phase map information is complimentary to the Amplitude field map, and may contain a pattern of elongated parallel fringes when the focused beam is not well aligned to the point-like scattering object such as the tip.

Figures 10A, 10B:
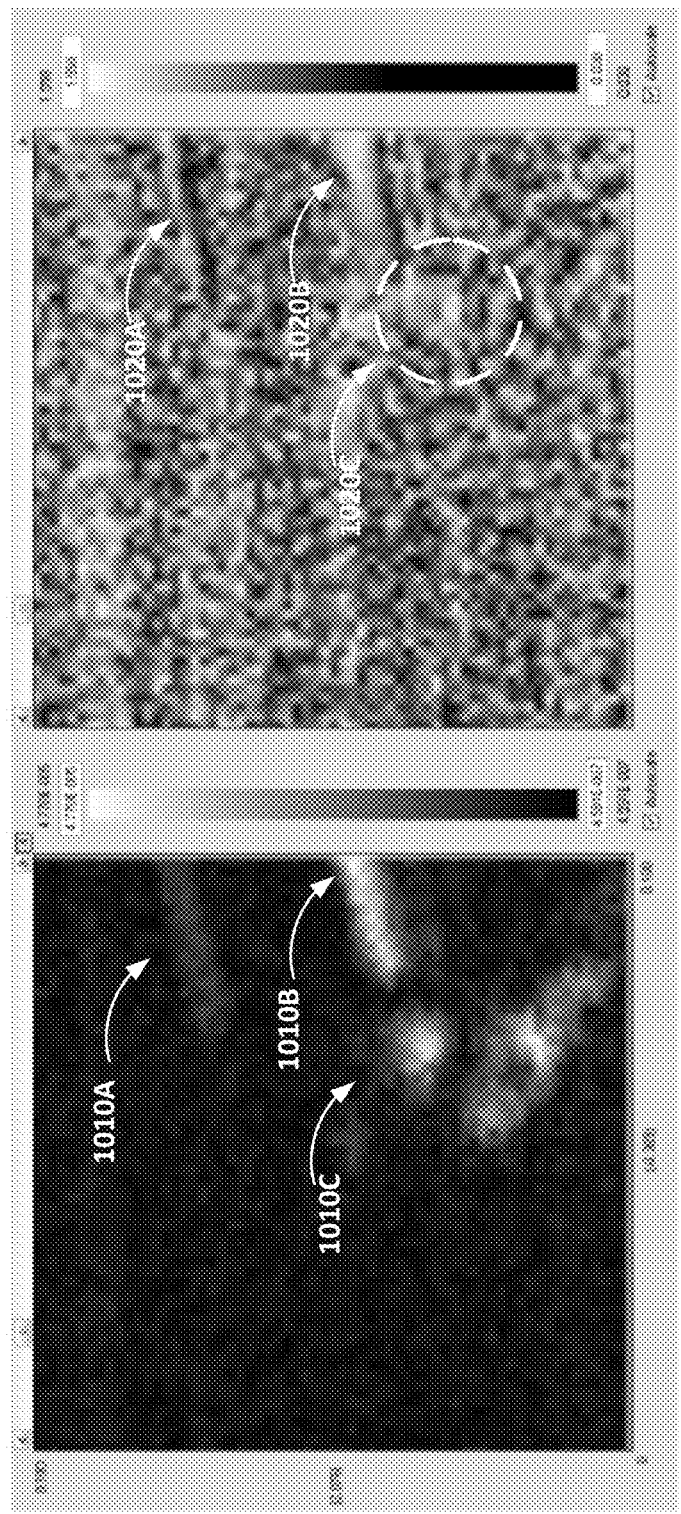
FIGS. 10A and 10B are images of the amplitude and phase portions of a field map pattern obtained with an embodiment of the present invention (and with the use of demodulation of the optical signal at the first harmonic of the frequency of vibration of the probe) after the spatial adjustment of the system 100 caused by the analysis of the patterns of FIGS. 9A, 9B.
Figures 12A, 12B:
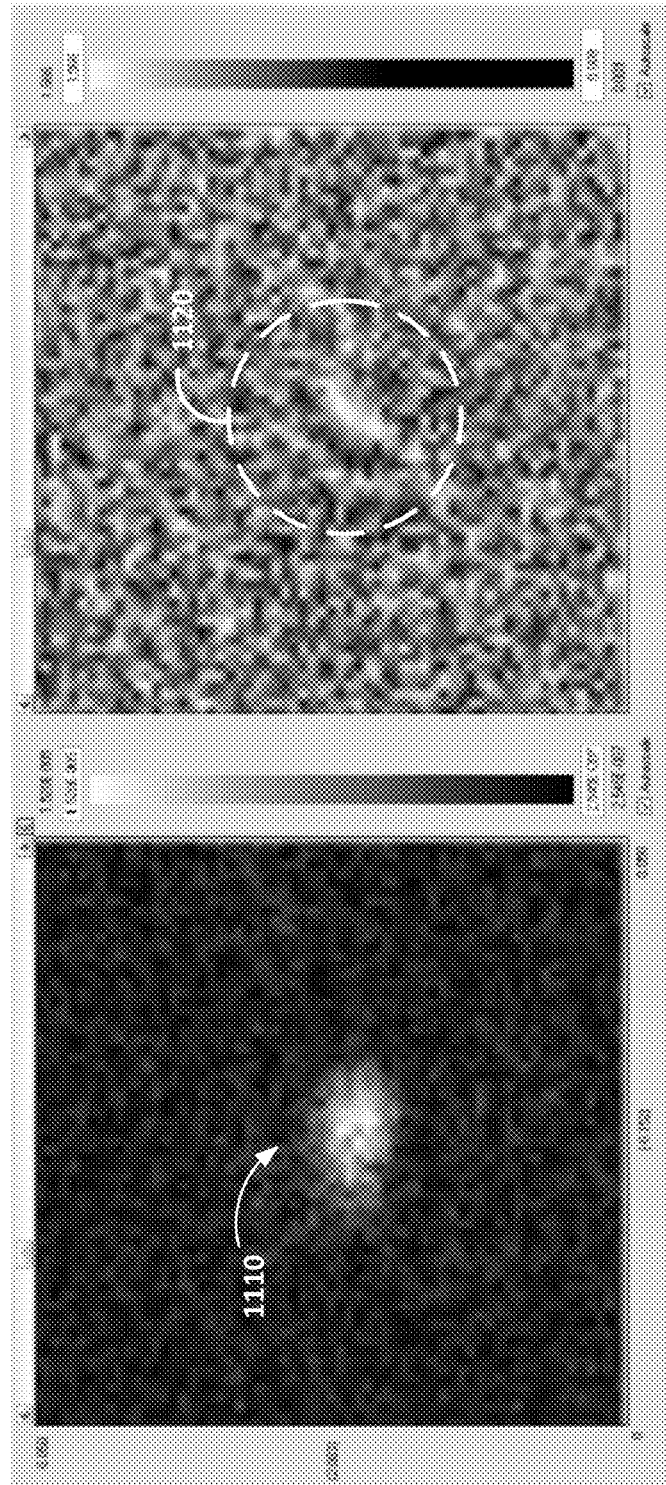
FIGS. 12A and 12B are images of the amplitude and phase portions of a field map pattern resulting from a zoom-in to the map of FIGS. 11A, 11B.

Additional insight can be gained from the empirical results of:

FIGS. 10A and 10B, showing respectively the amplitude and phase portions of the map of a 100×100 micron field obtained by demodulating the acquired optical signal at the second harmonic of the probe-vibration frequency. Both the amplitude and phase images show scattering 1010A, 1010B, 1020A, 1020B from an elongated object (cantilever of the probe, in this instance); scattering from the tip122 can be identified as 1010C, 1020C in the center-bottom part. It is notable that that linear fringes from cantilever in the phase image are less pronounced (in comparison with those of FIG. 9B); and that light-scattering the tip 122 produces circular fringes 1020C. In the amplitude image of FIG. 10A, the tip scattering signal still produces a local, not the global 1010C maximum, but the local maximum 1010C is more pronounced.

FIGS. 11A, 11B and 12A, 12B illustrate the map of a 100-by 100 micron field and the zoom-in to an area of 50-by-50 micron of that field, respectively. Here, the map is acquired under the conditions of the measurement corresponding to FIGS. 10A, 10B but the acquired optical signal was demodulated at the third harmonic of the probe-vibration frequency. Amplitude and phase images no longer exhibit scattering from elongated object (the cantilever of the probe 110), while scattering from the tip 122 is clearly visible in the amplitude image as a global maximum 1110. Having zoomed into a smaller portion of the images of FIGS. 11A, 11B, one could recognize that the phase portion of the field map, shown in FIGS. 11B, 12B, also exhibits a weak pattern 1120.

Figures 14A, 14B:
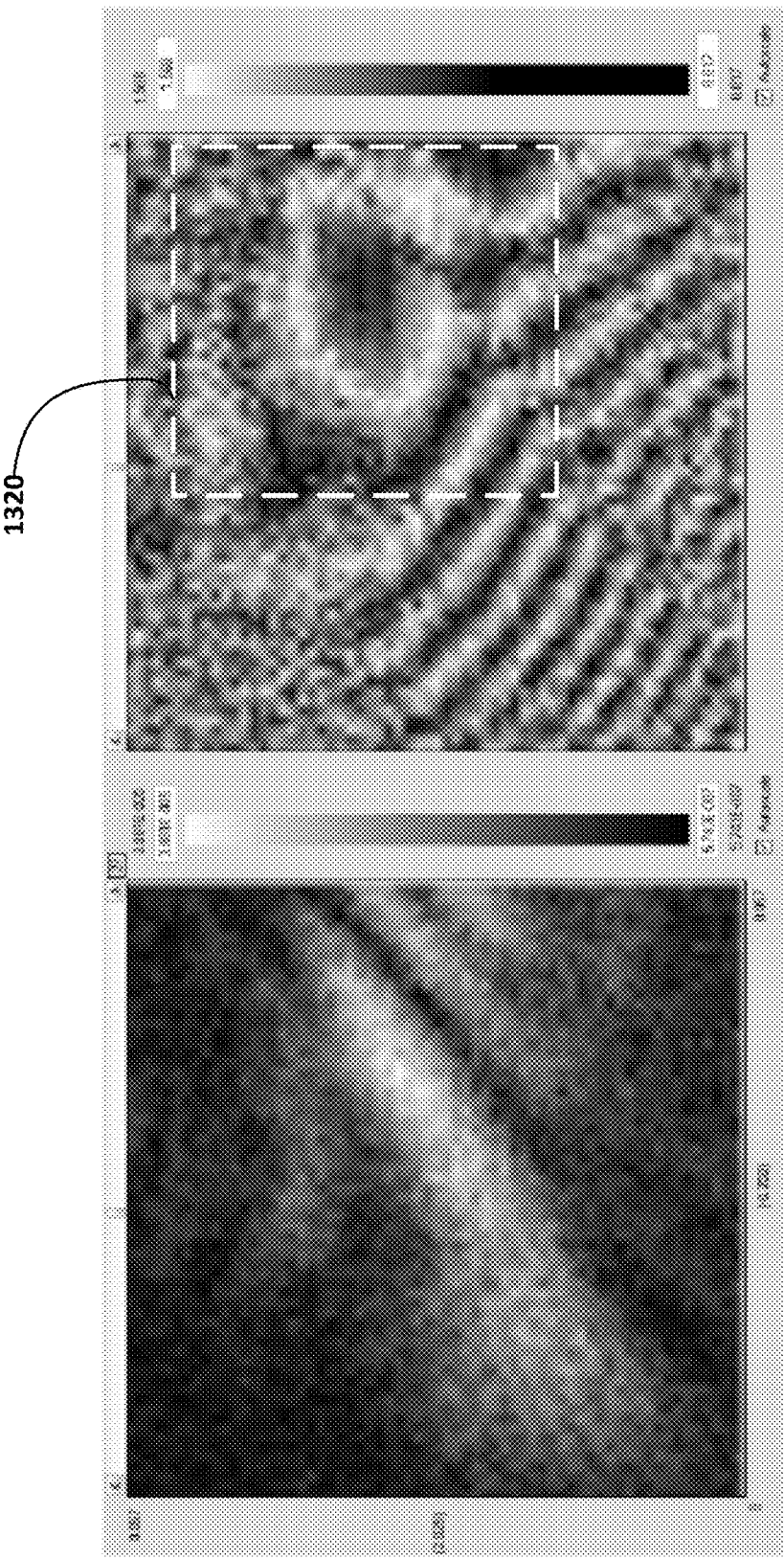
FIGS. 14A and 14B illustrates a zoom-in to the pattern of FIGS. 13A, 13B.
Figures 15A, 15B:
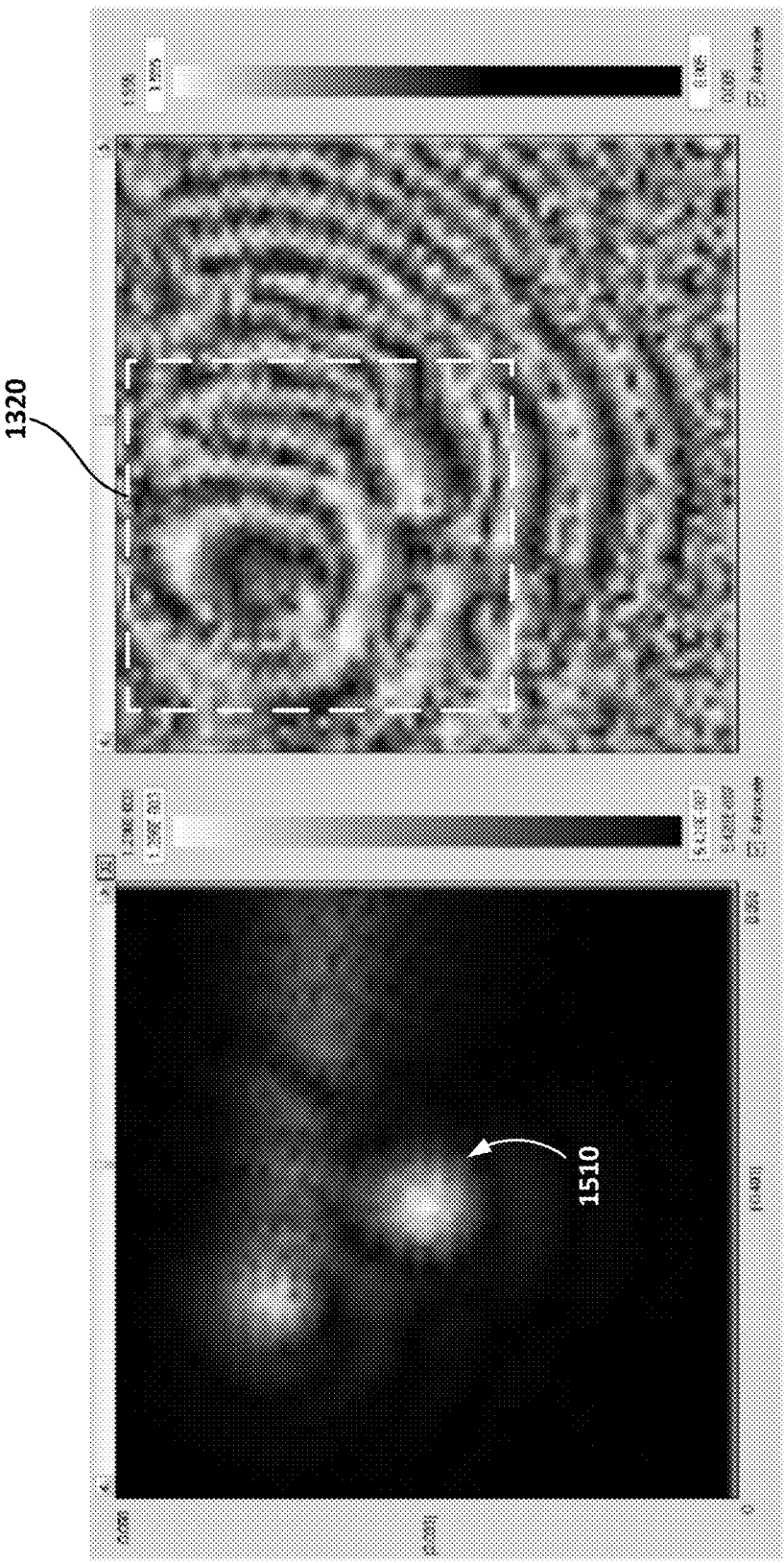
FIGS. 15A and 15B illustrate the results of mapping the field of FIGS. 14A, 14B after the focus-readjustment procedure carried out in reliance on the analysis of the pattern of FIGS. 14A, 14B.
Figures 16A, 16B:
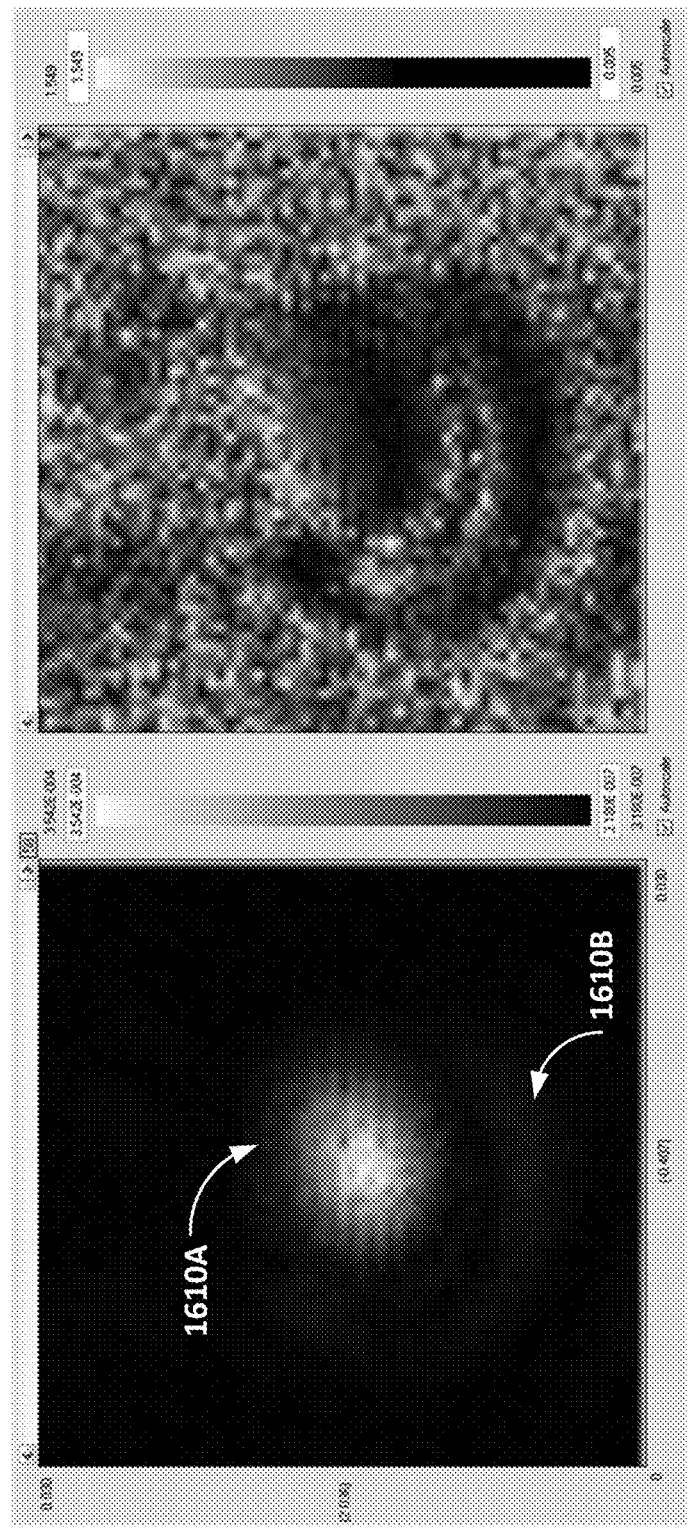
FIGS. 16A and 16B show the amplitude and phase portions of the field map obtained with the signal demodulation at the second harmonic of the probe-vibration frequency across the 30-by-30 micron field, clearly demonstration a central lobe 1610A and the emerging firs order lobe 1610B of the amplitude Airy pattern.

FIGS. 13A, 13B illustrate a field map of a 100-by-100 micron region, obtained as a results of the demodulation of the acquired optical signal at the 1st harmonic of the probe-vibration frequency. Here, both the amplitude and phase portions of the map (FIGS. 13A, 13B, respectively) unveil a complicated pattern with interference of light scattered by multiple elements (cantilever, probe shaft, multiple reflections from surface and probe). Although the sought-after scattering from the point-source (tip 122 of the probe 110) is not noticeable, a concentric pattern 1320 in the phase image of FIG. 13B is indicative of the location of the tip. The maps of FIGS. 14A, 14B are the result of zooming into a 57-by-57 micron area (corresponding to the map of FIGS. 13A, 13B) and re-centration of the map to position the concentric pattern 1320 closer to the center of the image. Using the indication, obtained from the pattern 1320, that the point-scatterer (the tip 122 of the probe) is not too far away from the focal plane of the beam 130A, the focus of the set-up100 was immediately adjusted, revealing a portion 1510 of the Airy pattern corresponding to the scattering of incident light by the tip in FIG. 15A. FIGS. 16A and 16B show the amplitude and phase portions of the field map obtained with the signal demodulation at the second harmonic of the probe-vibration frequency across the 30-by-30 micron field, clearly demonstration a central lobe 1610A and the emerging firs order lobe 1610B of the amplitude Airy pattern.

Overall, according to the idea of the invention, a tip of an s-SNOM probe is used to map the focal spot of the beam of light, purposely focused on the tip to provide optical data to the s-SNOM system during field-mapping procedure with spatial resolutions far exceeding the diffraction limit imposed by the wavelength of the incident light. The proposed methodology shortens the time required for optical alignment of the near-field optical system from the currently-typical one hour to several minutes and shorter. Based on the empirical discovery that the optical background accompanying the tip-illuminating light scattered by the probe can have complicated spatial patterns that present multiple false local extrema of irradiance, the described investigation identified a problem of erroneous optimization of the optical alignment of the near-file optical system by targeting a false local optimum point based on optical data acquired in reliance on the fundamental harmonic of the frequency of operation of the cantilever probe of the system. This problem was solved by devising a specifically-defined process of optical field mapping, in which the processing and demodulation of data at the $1^{st}$ harmonic can be further refined, when required, with the data demodulation at $2^{nd}$, $3^{rd}$ or higher harmonic(s) to unambiguously identify tight-focal-spot (substantially, a point source) pattern representing at least a central lobe of Airy disk like patterns in the field maps and effectively reject the unwanted background. This has been effectuated with a near-field system that included a light source; an optical interferometer having a first arm; a repositionable optical system; a near-field probe in optical communication with the light source through said first arm and the repositionable optical system; an optical detection unit configured to acquire light representing interferometric fringes at an output of the optical interferometer; and a programmable electronic circuitry operably coupled with tangible, non-transitory storage medium containing program code thereon. This code, when loaded on the programmable electronic circuitry, causes the circuitry to detect a spatial light pattern obtained in light that has been delivered, through the optical system to the probe and backscattered by the probe; and to reposition the optical system to cause a focal spot of a beam of light, that has been delivered to the probe through said optical system, spatially coincide with a tip of the probe such as to maximize an irradiance, of the spatial light pattern, that is caused by a near-field optical wave produced only by the tip in response to interaction thereof with the beam of light.

Corresponding computer program product (for use on a computer system for governing an optical alignment of a near-field optical system) includes a computer-readable tangible non-transitory medium on which are stored computer instructions such that, when the instructions are executed by a processor, the instructions cause the processor to:

a) acquire data representing a spatial light pattern interferometrically formed with the use of a first light beam that has been converged, through an optical system of the near-field system, on a region of interest (ROI) including a tip of a cantilever probe of the near-field system, to form a converged light beam, and back-scattered by said ROI to an optical detection unit of the near-field system;

b) reposition an element of said optical system along a spatial trajectory to define a target spatial coordination, between the optical system and the ROI, wherein the target spatial coordination (i) represents a positioning of a focal spot of the light beam on the tip, and (ii) causes maximization of a far-field irradiance sensitive to a near-field optical wave at the ROI; and c) form an image associated with a near-field optical wave generated by the ROI in response to interaction thereof with the converged light beam and corresponding to a position along the spatial trajectory. The instructions further cause the processor to form the image that contains a feature, of the spatial light pattern, indicating that the target spatial coordination has been achieved.

As a skilled artisan will readily appreciate, the proposed methodology can be appropriately extended to facilitate the quantification of the size of the focal spot by measuring the distance(s) from the global maximum of the irradiance distribution (corresponding to the Airy peak) to the first minimum of such distribution. The obtained result can be compared with the calculations based on the numerical aperture of the focusing optics of the near-field system; an agreement or degree of match between the measured and calculated values would indicate whether an optimal, diffraction-limited focus spot has been reached. Appropriate calibration of a mechanical-positioning unit enables the system to obtain valuable diagnostic information from detected patterns of light scattered by the tip of the near-field probe, opening a door to characterization and comparison of the "s-SNOM-quality" of the probe.

Example 2: Embodiment of the Invention Employing a DSCD Methodology for Chemical Characterization of a Sample While the idea and implementations of the invention are described through the above-described examples embodiments, it will be understood by those of ordinary skill in the art that modifications to, and variations of, the illustrated embodiments may be made without departing from the disclosed inventive concepts. For example, an embodiment of the invention as described herein can be used in conjunction with or as part of any of the embodiments and methodologies structured for nanoidentification of sample properties, discussed in WO 2014/144496, the entire disclosure of which is incorporated herein by reference. In particular, embodiments of the present invention can be practiced with a system that is configured to perform background suppression with the use of real time time-domain signal processing (instead of frequency domain lock-in amplification methods, conventionally used in related art) and that is directed to nano-identification (nano-ID) of a sample, nano-ID measurements of sample properties, and, more particularly, to using an optical antenna in an instrument providing optical characterization of a sample with the use of evanescent waves, on a spatial scale below 50 nm or even below 20 nm.

Examples of the methodology of suppression of a background signal according to the so-called DSCD algorithm in context of determination of a chemical characteristic of the sample under test were discussed in WO 2014/144496, in reference to at least FIGS. 3A, 3B, 4A, 4B, 5, 6, 7A, 6B, 7C, 8A, 8B, 8C, 9, and 10 thereof. According to the idea of the determination of the chemical characteristic of the sample with the use of the DSCD algorithm, information about the complex-valued near-field component $E_{nf}$ is obtained from the output $V_{det}$ of phase-sensitive detector, $$V_{det} \sim E_{ref} E_{nf} \cos(\varphi_{ref} - \varphi_{nf}) + E_{bg} E_{nf} \cos(\varphi_{bg} - \varphi_{nf}) + E_{ref} E_{bg} \cos(\varphi_{ref} - \varphi_{bg}) + E^2_{ref} + E^2_{nf} + E^2_{bg}$$

where $E_{ref}$ is reference electromagnetic field, $E_{bg}$ is a background components of the electromagnetic field, and $\varphi_{bg}$, $\varphi_{ref}$, $\varphi_{nf}$ are corresponding phases. Based on such information, the data representing the frequency-dependent reflection coefficient $r(k, \omega)$ of the sample is procured at the frequency or frequencies of light irradiating the tip. The imaginary part of $E_{nf}$ is related to the imaginary part of the reflection coefficient $\text{Im}\{r(k, \omega)\}$ which can, in turn, be used to assess absorption, $\text{Im}\{n(k, \omega)\}$, of incident light by the sample. The determination of a chemical characteristic of the sample is further effectuated by comparing the measured value of $\text{Im}\{n(k, \omega)\}$ to a reference absorption spectrum from a database of results of previously-carried-out measurements (for example, to an absorption spectrum of a known material sample measured at time different from the time of the measurement of the current sample under test).

The DCSD algorithm discussed in WO 2014/144496 and optionally used in conjunction with an embodiment of the present invention, is configured to employ a principle of gating the separation distance between the tip of the AMF's probe and the sample, according to which only those data points are used from the interferometric information (acquired by the s-SNOM system from backscattering of light from the tip-sample region) that correspond to chosen phases of the repeated oscillation of the AFM's tip with respect to the surface of the sample under test. As such, the useful optical data is collected at the moments corresponding to some distinct separation distance(s) z between the apex of the nanoantenna (AFM tip) and the sample surface (instead of being collected continuously, for example) while, generally, without explicit knowledge of what such separation distance(s) is. The rest of the data points, even if acquired, are excluded from the calculation. (In stark contradistinction with the requirements of the pseudoheterodyne methodology, the acquisition of the interferometric information according to the DSCD embodiment is carried with modulation of the sample-to-tip separation that does not have to be sinusoidal).

Accordingly, the measurement methodology according to an embodiment of the present invention may additionally include as least some of the steps of the measurement procedure discussed in reference to paragraphs [0085] through [0095] and FIG. 6 of WO 2014/144496. For example, an embodiment of the method of the invention may include:

normalizing a portion of optical data (acquired from the detected spatial pattern and representing electromagnetic field caused by near-field interaction between the tip of the probe and the surface of the sample during a motion of the tip above the sample) by reference optical data that have been interferometrically acquired in a process of backscattering by the tip moving above a surface of a reference sample, to determine at least one of real and imaginary parts of a complex-valued difference between first and second values of the electric field characterizing the near-field interaction, where such first and second values respectively correspond to first and second phases of the motion of the tip above the sample. In the process of such normalization, a spectral distribution of at least one of these real and imaginary parts can be determined to identify a component of a complex-valued permittivity of the sample. Optionally, the motion of the tip may include scanning a surface of the sample within a scanning range, while the reference sample is located outside of said scanning range during the process of detection of the spatial light pattern;

moving a tip of the probe in a recurring motion above the sample under test and negating a contribution of background electromagnetic radiation into an optical signal (acquired by the optical detector of the near-field system) by irradiating the tip with light from a CW laser source and detecting such optical signal only at the moments corresponding to a chosen phase of the recurring motion. In addition or alternatively, optical data extracted from the spatial light pattern detected by the optical detector is being processed in time domain;

employing the beam of light including a plurality of wavelengths while forming the spatial light pattern (to be detected by the optical detector) by interfering two portions of the said beam of light that has been backscattered. One of the portions is delayed in phase with respect to another by an amount that is being modulated and, in a specific case, such amount is being continuously changed (in a reference arm of an interferometer of the optical system of the near-field system) according to a periodic function characterized by a modulation frequency.

suppressing a contribution of background electromagnetic radiation to optical data acquired by the detector and representing the near-field interaction between the tip and the sample by determining acquiring such optical data at first, second, third and fourth phases (of the motion of the tip above the sample) as respective first, second, third, and fourth values, and determining a difference between a sum of the first and third values and a sum of the second and fourth values;

other steps of the DSCD-related optical data acquisition and processing disclosed in WO 2014/144496.

An embodiment of the method for optical alignment of a near-field system, according to the idea of the invention, is illustrated in a flow chart of FIG. 17A. Here, at step 1710, a spatial light pattern (obtained in light that has been delivered through an optical system of said near-field system to a probe of the near-field system and backscattered by said probe) is detected. Such pattern may be collected in a beam of light, which recombines a first portion of light irradiating the probe of the near-field system and that has been backscattered by the probe with a second portion of light irradiating the probe that is delayed with respect to the first portion, and which is further converged onto a single-pixel detector, for example. At step 1720, the optical system is being repositioned to cause a focal spot of a beam of light, which has been delivered to the probe through said optical system, spatially coincide with a tip of the probe. Repositioning of the optical system and optical detection of the pattern continues until an amplitude of a portion of the detected pattern is sensitive to a near-field optical wave produced only by the tip in response to interaction thereof with said beam of light is maximized. The near-field system can be operably cooperated with a sample under test, and the process of maximization of the amplitude of the portion of the pattern (as detected by the optical detector) can, in one embodiment, be devoid of using optical data that represents any of mechanical response, thermal expansion, and photothermal response of the sample irradiated with said beam of light. The process of alignment of the system may be accompanies by the process of vibrating the tip at a chosen frequency above the surface of the sample under test, while the process of maximizing the amplitude of the portion of the detected pattern includes demodulating optical data representing the spatial light pattern at a harmonic of the frequency of the tip vibration. In one implementation, the process may additionally include a step of determination, from optical data representing irradiance of the spatial light pattern, a geometrical characteristic of the pattern defined with respect to a point of the pattern that corresponds to a maximum value of the irradiance and, in a specific embodiment, determining whether afocal spot of light on the tip is diffraction limited based on comparison between the geometrical parameter with a geometrical value representing a diffraction limited focal spot. The step of repositioning may include changing at least one of a position and an orientation of the optical system with respect to the probe (while the tip is being vibrated at a chosen frequency) to form an image of a region of interest (ROI) irradiated with the beam. The ROI includes the tip, and the formed image contains at least a central lobe of an Airy pattern. The optical data collected by an optical detector from the pattern may be processed in time domain to extract a first portion of the data that represent electromagnetic field caused by near-field interaction between the tip and a surface of the sample during a motion of the tip above the surface.

The method may further include a) normalizing the first portion of the optical data collected by the detector by reference optical data (that have been acquired with the near-field system in a process of backscattering of light by a tip moving above the surface of the reference sample) to determine at least one of real and imaginary pats of a complex-valued difference between first and second values of electric field characterizing said near-field interaction, wherein the first and second values respectively correspond to first and second phases of the motion. The method may further include b) suppressing a contribution of background electromagnetic radiation to the first portion to obtain a second portion of said data in which such contribution is reduced as compared to the first portion, wherein said suppressing includes determining the first portion at first, second, third, and fourth phases of the tip motion as respective first, second, third, and fourth values , and further determining a difference between a sub of the first and third values and a sum of the second and fourth values. The motion may include a recurring motion, while the method further contains a step of negating a contribution of background electromagnetic radiation in the first portion by irradiating the tip with pulsed laser only at moments corresponding to a chosen phase of the recurring motion. In a specific case, such negating includes irradiating the tip only at the moments corresponding to a phase, of the recurring motion, that has been chosen without knowledge of a separation distance between the tip and the surface of the sample. Alternatively or in addition, the motion may include a recurring motion and the method may include a process of negating a contribution of background electromagnetic radiation in the first portion by irradiating the tip with light from a CW laser source, and detecting the spatial light pattern only at moments corresponding to a chosen phase of the recurring motion.

An embodiment of the method may additionally include processing data representing a detected spatial light pattern to extract a first portion of the data that represent electromagnetic field caused by near-field interaction between the tip and a surface of the sample during a recurring motion of the tip above the surface (the tip-irradiating light including a plurality of wavelengths, wherein the step of detection includes acquiring the spatial light pattern by interfering two portions of such light, one of which portions has been delayed in phase with respect to another by an amount that is being modulated during the process of acquisition, the acquiring occurring only at moments corresponding to a chosen phase of the recurring motion.

A related embodiment of the method of the invention is schematically illustrated in FIG. 17B. Here, step 1750 signifies acquiring, with an optical detection unit of the near-field system, optical data representing a spatial light pattern formed with the use of a first light beam that has been (i) converged, through an optical system of the near-field system, on a region of interest (ROI) including a tip of a cantilever probe of the near-field system, to form a converged light beam and (ii) back-scattered by the ROI. At step 1760, based on an output generated by the optical detection unit in response to said acquiring, the optical system is being repositioned along a spatial trajectory to achieve a target spatial coordination, between said optical system and said ROI. In a specific case, the process of achieving said target spatial coordination includes (a) causing a focal spot of said first light beam to coincide with a tip of the near-field system, and (b) maximizing an amplitude of the spatial light pattern, wherein the amplitude is sensitive to a near-field optical wave produced only by the tip in response to interaction thereof with the converged light beam. In one embodiment, the process of acquiring includes acquiring optical data representing the spatial light pattern that has been formed by interfering two portions of the first light beam, one of which portions has been delayed in phase with respect to another. A method further includes forming an image associated with the near-field optical wave and corresponding to a position along the spatial trajectory. Optionally, the formation of such image is accompanied by vibrating the tip of the probe at a chosen frequency and demodulation of the image data at a harmonic of such frequency, at 1770 and 1780. The detection of a feature of the image that indicates that the target spatial coordination between said optical system and said ROI has been achieved is performed at step 1790. Such feature of the image is indicative of a diffraction-limited characteristic of a converged beam of light irradiating the top of the probe. In a specific case, the near-field system is operably cooperated with a sample under test while the process of achieving the target spatial coordination is devoid of using optical data representing any of mechanical response, thermal expansion, thermal expansion, and photo-thermal response of the sample irradiated with the converged light beam.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Embodiments of the invention—both system and methods—have been described as employing a processor controlled by instructions stored in a memory. The memory may be random access memory (RAM), read-only memory (ROM), flash memory or any other memory, or combination thereof, suitable for storing control software or other instructions and data. Some of the functions performed by the circuitry unit 142 and/or AFM control circuitry 114 have been described with reference to flowcharts and/or block diagrams. Those skilled in the art should readily appreciate that functions, operations, and/or decisions of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. While the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Disclosed aspects, or portions of these aspects, may be combined in ways not listed above. Accordingly, the implementation(s) of the invention should not be viewed as being limited to the disclosed embodiment(s).

What is claimed is:

1. A near-field system comprising:
a light source;
an optical interferometer having a sample arm and a reference arm;
a repositionable optical system;
a near-field probe in optical communication with the light source through said sample arm and the repositionable optical system,
an optical detection circuitry including an optical detector configured to acquire light representing interferometric fringes at an output of the optical interferometer,
a programmable electronic circuitry, and
a computer program product comprising a computer-readable tangible, non-transitory storage medium containing program code thereon which, when loaded on the programmable electronic circuitry, causes the programmable electronic circuitry
to acquire data representing a spatial light pattern interferometrically formed with the use of a first light beam that has been
(i) converged, through the repositionable optical system of the near-field system, on a region of interest (ROI) including a tip of a cantilever probe of the near-field system, to form a converged light beam, and
(ii) back-scattered by said ROI to the optical detection circuitry of the near-field system; and
to reposition the repositionable optical system to cause a focal spot of a beam of light, that has been delivered to the probe through said optical system, to maximize an irradiance, of the spatial light pattern, that is caused by a near-field optical wave produced only by the tip in response to interaction thereof with the beam of light and that is acquired by the optical detector.

2. The near-filed system according to claim 1, wherein said program code causes the programmable electronic circuitry to maximize the irradiance without using optical data that represent any of mechanical response, thermal expansion, and photo-thermal response of a sample under test located in the vicinity of the tip during operation of the near-field system.

3. The near-field system according to claim 1, wherein said program code is further configured to cause the programmable electronic circuitry
to vibrate the tip at a chosen frequency above a surface of a sample under test, and
to maximize the irradiance by demodulating optical data representing said spatial light pattern at a harmonic of the chosen frequency.

4. The near-field system according to claim 1, wherein said program code is further configured to cause the programmable electronic circuitry
to determine, from optical data representing the irradiance of said spatial light pattern, a geometrical characteristic of the spatial light pattern defined with respect to a point, of the spatial light pattern, that corresponds to a maximum value of said irradiance.

5. The near-field system according to claim 4, wherein said program code is further configured to cause the programmable electronic circuitry to determine whether said focal spot is diffraction-limited, based on comparison between the geometrical characteristic and a geometrical value representing a diffraction-limited focal spot.

6. The near-field system according to claim 5, wherein said image contains at least a central lobe of an Airy pattern.

7. The near-field system according to claim 1, wherein said program code is further configured to cause the programmable electronic circuitry
to reposition an element of said optical system along a spatial trajectory to define a target spatial coordination, between said optical system and said ROI,
wherein the target spatial coordination (i) represents a positioning of the focal spot of said beam of light on the tip, and (ii) causes maximization of a far-field irradiance sensitive to a near-field optical wave at the ROI; and
to form an image associated with a near-field optical wave generated by said ROI in response to interaction thereof with said converged light beam and corresponding to a position along said spatial trajectory.

8. The near-field system according to claim 1, wherein the optical detector is single-area detector.

9. The near-field system according to claim 1, further structured to utilize the same first beam to acquire, in absence of a beam of visible light in the near-field system, both
first optical data representative of a degree of alignment of the first beam with respect to the tip, and
second optical data representative of a change in spatial positioning of the probe with respect to a sample under test in the near-field system.

10. A method for optical alignment of a near-field system, the method comprising:
reiteratively repositioning an optical system of the near-field system to cause a focal spot of a first beam of light, that has been delivered to the probe through an arm of an optical interferometer and said optical system, to spatially coincide with a tip of a probe of the near-field system; and
at each of positions, assumed by the optical system in a process of said relative repositioning, detecting, with an optical detection circuitry that includes a single-area optical detector, a corresponding optical signal generated by the single-area detector in response to a corresponding irradiance distribution that has been formed on said detector by converging a second beam of light with the use of an optically-focusing element,
wherein the irradiance distribution represents a spatial light pattern formed with the use of the second beam of light,
wherein the second beam of light includes light, from the first beam of light, that has been backscattered by the probe;
forming a distribution of irradiance values, represented by optical signals acquired during said detecting at each of relative positions, as a function of at least one of position and orientation of the optical system with respect to the probe, wherein the irradiance values represent a degree of confinement of the first beam of light on the tip of the probe; and
determining a maximum irradiance value, of said distribution of irradiance values, that corresponds to a target position of the optical system with respect to the tip, said maximum irradiance value representing a near-field optical wave produced only by the tip in response to interaction thereof with said first beam of light.

11. The method according to claim 10, wherein said detecting includes detecting the optical signal generated by the single-area detector in response to the spatial light pattern formed by converging the second beam of light with the use of the optically-focussing element that is optically separated from the tip of the probe by said arm of the optical interferometer.

12. A method according to claim 10, further comprising at least one of
   (i) operably cooperating a sample under test with the near-field system, wherein said determining is devoid of using optical data representing any of mechanical response, thermal expansion, and photo-thermal response of the sample under test irradiated with said beam of light;
   (ii) vibrating the tip at a chosen frequency above a surface of the sample under test, wherein said determining includes demodulating optical data representing said spatial light pattern at a harmonic of said chosen frequency; and
   (iii) determining, from optical data of said spatial pattern, a geometrical characteristic of said spatial pattern defined with respect to a point, of said spatial pattern, that corresponds to the maximum irradiance value.

13. The method according to claim 12, wherein the demodulating includes demodulating optical data representing said spatial pattern at the harmonic of the chosen frequency that differs from the chosen frequency.

14. The method according to claim 12, further comprising determining whether the focal spot is diffraction-limited by comparing the geometrical characteristic with a geometrical value representing a diffraction-limited focal spot.

15. The method according to claim 10, wherein the reiteratively repositioning includes
   based on the optical signal, repositioning said optical system along a spatial trajectory to achieve a target spatial coordination between said optical system and said probe,
   wherein achieving said target spatial coordination includes causing the focal spot of said first light beam to irradiate only the tip of the probe, and
   wherein the second beam of light includes light, from the first beam of light, that has been backscattered only by said tip of the probe.

16. The method according to claim 10, wherein the reiteratively repositioning includes changing at least one of a position and an orientation of said optical system with respect to the probe, while the tip is being vibrated at a chosen frequency, to form an image of a region of interest irradiated with said first beam of light,
   wherein the region of interest includes the tip,
   wherein the image contains at least a central lobe of an Airy pattern.

17. The method according to claim 10, further comprising processing data, which represent optical signals generated by the single-area detector for the positions of the optical system, in time domain to extract a first portion of the data that represent electromagnetic field caused by near-field interaction between the tip and a surface of the sample under test during a motion of a tip above the surface.

18. The method according to claim 17, further comprising:
   normalizing the first portion of the data by reference optical data to determine at least one of real and imaginary pats of a complex-valued difference between first and second values of electric field characterizing said near-field interaction,
   wherein the reference optical data have been acquired with the near-field system in a process of backscattering of said first beam of light by the tip moving above the surface of a reference sample, and
   wherein the first and second values respectively correspond to first and second phases of the motion.

* * * * *

UNITED STATES PATENT AND TRADEMARK OFFICE
CERTIFICATE OF CORRECTION

PATENT NO. : 10,161,960 B1  
APPLICATION NO. : 16/055430  
DATED : December 25, 2018  
INVENTOR(S) : Sergey Osechinskiy and Gregory Andreev It is certified that error appears in the above-identified patent and that said Letters Patent is hereby corrected as shown below:

On the Title Page

Item (54) and in the Specification, Column 1, Lines 1-2, in the title:
"FILED-MAPPING AND FOCAL-SPOT TRACKING FOR S-SNOM"
Should read:
--FIELD-MAPPING AND FOCAL-SPOT TRACKING FOR S-SNOM--

Signed and Sealed this
Twenty-ninth Day of January, 2019

Andrei Iancu
*Director of the United States Patent and Trademark Office*